US011926207B2

(12) United States Patent
McKibben et al.

(10) Patent No.: US 11,926,207 B2
(45) Date of Patent: Mar. 12, 2024

(54) BATTERY AND AUXILIARY COMPONENTS FOR VEHICLE TRAILER

(71) Applicant: Hexagon Purus North America Holdings Inc., Lincoln, NE (US)

(72) Inventors: Ethan J. McKibben, Kelowna (CA); Jordan Foster, Kelowna (CA)

(73) Assignee: Hexagon Purus North America Holdings Inc., Lincoln, NE (US)

(*) Notice: Subject to any disclaimer, the term of this patent is extended or adjusted under 35 U.S.C. 154(b) by 14 days.

(21) Appl. No.: 17/450,115

(22) Filed: Oct. 6, 2021

(65) Prior Publication Data
US 2022/0111716 A1  Apr. 14, 2022

Related U.S. Application Data

(60) Provisional application No. 63/089,737, filed on Oct. 9, 2020.

(51) Int. Cl.
*B60K 1/04* (2019.01)
*B60L 50/60* (2019.01)
*B60L 58/26* (2019.01)

(52) U.S. Cl.
CPC ............... *B60K 1/04* (2013.01); *B60L 50/66* (2019.02); *B60L 58/26* (2019.02); *B60K 2001/0444* (2013.01); *B60L 2200/36* (2013.01)

(58) Field of Classification Search
CPC ... B60K 1/04; B60K 2001/0444; B60L 50/66; B60L 58/26; B60L 2200/26
See application file for complete search history.

(56) References Cited

U.S. PATENT DOCUMENTS

| | | |
|---|---|---|
| 1,551,594 A | 9/1925 | Maurice |
| 1,678,033 A | 7/1928 | Brumbaugh |
| 3,760,134 A | 9/1973 | McCray |

(Continued)

FOREIGN PATENT DOCUMENTS

| | | |
|---|---|---|
| AU | 2018232986 | 4/2019 |
| CN | 2647706 | 10/2004 |

(Continued)

OTHER PUBLICATIONS

Kenworth, "K270E, Zero Emissions", 2020, in 2 pages.

(Continued)

*Primary Examiner* — Jason D Shanske
*Assistant Examiner* — James J Triggs
(74) *Attorney, Agent, or Firm* — Knobbe, Martens, Olson & Bear, LLP

(57) ABSTRACT

A trailer mountable power storage and distribution system is provided. The power storage and distribution system includes a battery assembly and an auxiliary component assembly. The battery assembly includes a housing configured to be mounted to a chassis assembly of a trailer unit. The auxiliary component assembly is configured to be mounted to the chassis assembly of the trailer unit. The auxiliary component assembly has a thermal management component and a power distribution module. The thermal management component is configured to remove heat from the battery assembly. The power distribution module is configured to electrically connect the battery assembly to a load disposed on a tractor configured to tow the trailer unit.

20 Claims, 11 Drawing Sheets

(56) References Cited

U.S. PATENT DOCUMENTS

| | | |
|---|---|---|
| 3,883,794 A | 3/1975 | Sivley |
| 4,248,323 A | 2/1981 | Gaffney |
| 4,317,497 A | 3/1982 | Alt et al. |
| 4,365,681 A | 12/1982 | Singh |
| 4,435,990 A | 3/1984 | Chalmers |
| 5,421,600 A | 6/1995 | Jones et al. |
| 5,460,234 A | 10/1995 | Matsuura et al. |
| 5,558,949 A | 9/1996 | Iwatsuki et al. |
| 5,585,205 A | 12/1996 | Kohchi |
| 5,854,517 A | 12/1998 | Hines |
| 6,148,928 A | 11/2000 | Spears |
| 6,188,574 B1 | 2/2001 | Anazawa |
| 6,443,253 B1 | 9/2002 | Whitehead et al. |
| 6,547,020 B2 | 4/2003 | Maus et al. |
| 6,575,258 B1 | 6/2003 | Clemmer |
| 6,624,610 B1 | 9/2003 | Ono et al. |
| 6,668,957 B2 | 12/2003 | King |
| 6,971,657 B2 | 12/2005 | King et al. |
| 7,051,825 B2 | 5/2006 | Masui et al. |
| 7,144,039 B2 | 12/2006 | Kawasaki et al. |
| 7,174,967 B2 | 2/2007 | Raimondo et al. |
| 7,237,644 B2 | 7/2007 | Matsumoto et al. |
| 7,398,849 B2 | 7/2008 | Yoshida |
| 7,507,499 B2 | 3/2009 | Zhou et al. |
| 7,543,454 B2 | 6/2009 | Harris |
| 7,686,720 B2 | 3/2010 | Nikolai |
| 7,931,105 B2 | 4/2011 | Sato et al. |
| 8,037,960 B2 | 10/2011 | Kiya |
| 8,051,934 B2 | 11/2011 | Kiya et al. |
| 8,122,989 B2 | 2/2012 | Burchett |
| 8,127,876 B2 | 3/2012 | Phillips |
| 8,276,697 B2 | 10/2012 | Takasaki |
| 8,342,279 B1 | 1/2013 | Florus et al. |
| 8,397,853 B2 | 3/2013 | Stefani et al. |
| 8,464,817 B2 | 6/2013 | Usami et al. |
| 8,474,559 B2 | 7/2013 | Sogabe |
| 8,517,126 B2 | 8/2013 | Atarashi |
| 8,596,685 B2 | 12/2013 | Mauduit et al. |
| 8,616,319 B2 | 12/2013 | Yokoyama et al. |
| 8,672,354 B2 | 3/2014 | Kim et al. |
| 8,701,842 B2 | 4/2014 | Anderson |
| 8,764,469 B2 | 7/2014 | Lamb |
| 8,776,927 B2 | 7/2014 | Akazawa et al. |
| 8,778,527 B2 | 7/2014 | Lee |
| 8,783,396 B2 | 7/2014 | Bowman |
| 8,789,635 B2 | 7/2014 | Franzen et al. |
| 8,794,361 B2 | 8/2014 | Lim et al. |
| 8,905,170 B2 | 12/2014 | Kyoden et al. |
| 9,033,078 B2 | 5/2015 | Fillion et al. |
| 9,033,085 B1 | 5/2015 | Rawlinson |
| 9,056,557 B2 | 6/2015 | Kedzierski |
| 9,061,712 B2 | 6/2015 | Patberg et al. |
| 9,077,019 B2 | 7/2015 | Kosaki et al. |
| 9,085,226 B2 | 7/2015 | Matsuda et al. |
| 9,103,092 B2 | 8/2015 | Ueda |
| 9,108,497 B2 | 8/2015 | Harrison et al. |
| 9,108,691 B2 | 8/2015 | Fanourakis et al. |
| 9,205,749 B2 | 12/2015 | Sakamoto |
| 9,227,582 B2 | 1/2016 | Katayama et al. |
| 9,283,838 B2 | 3/2016 | Ohashi |
| 9,315,173 B1 | 4/2016 | Gray et al. |
| 9,321,352 B2 | 4/2016 | Pierce et al. |
| 9,409,495 B2 | 8/2016 | Kobayashi |
| 9,457,652 B2 | 10/2016 | Sloan et al. |
| 9,586,490 B2 | 3/2017 | Yamamaru et al. |
| 9,636,984 B1 | 5/2017 | Baccouche et al. |
| 9,776,665 B2 | 10/2017 | Garay et al. |
| 9,812,685 B2 | 11/2017 | Nozaki et al. |
| 9,884,545 B1 | 2/2018 | Addanki et al. |
| 9,887,570 B2 | 2/2018 | Johnsen et al. |
| 9,902,348 B2 | 2/2018 | Takeda |
| 10,000,908 B2 | 6/2018 | Ota et al. |
| 10,017,037 B2 | 7/2018 | Newman et al. |
| 10,121,609 B2 | 11/2018 | Coursol |
| 10,160,344 B2 | 12/2018 | Newman |
| 10,166,883 B2 | 1/2019 | Brendecke et al. |
| 10,177,356 B1 | 1/2019 | Yang et al. |
| 10,183,698 B2 | 1/2019 | Ta et al. |
| 10,193,112 B2 | 1/2019 | Zimbru, Jr. et al. |
| 10,199,781 B2 | 2/2019 | Deatherage |
| 10,201,913 B2 | 2/2019 | McNeilus et al. |
| 10,236,496 B2 | 3/2019 | Nakayama et al. |
| 10,245,972 B2 * | 4/2019 | Healy .................... B60L 8/003 |
| 10,259,329 B2 | 4/2019 | Hosaka et al. |
| 10,308,132 B2 | 6/2019 | Milton et al. |
| 10,358,023 B2 | 7/2019 | Hegewald et al. |
| 10,358,024 B2 | 7/2019 | Yugami et al. |
| 10,414,351 B2 | 9/2019 | Katano |
| 10,421,345 B2 | 9/2019 | Kerspe et al. |
| 10,427,627 B2 | 10/2019 | Fukazu et al. |
| 10,457,156 B2 | 10/2019 | Takizawa et al. |
| 10,464,613 B2 | 11/2019 | Okura |
| 10,486,515 B2 | 11/2019 | Saeki |
| 10,493,837 B1 | 12/2019 | Angelo et al. |
| 10,516,146 B2 | 12/2019 | Fees et al. |
| 10,543,796 B2 | 1/2020 | Isafushi et al. |
| 10,559,858 B2 | 2/2020 | Goitsuka et al. |
| 10,569,634 B2 | 2/2020 | Dawley |
| 10,583,746 B2 | 3/2020 | Ogaki et al. |
| 10,589,788 B1 | 3/2020 | Milton et al. |
| 10,589,797 B2 | 3/2020 | Milton et al. |
| 10,604,188 B2 | 3/2020 | Yoshii |
| 10,611,408 B2 | 4/2020 | Fritz et al. |
| 10,641,431 B2 | 5/2020 | Mallick et al. |
| 10,654,530 B2 | 5/2020 | Milton et al. |
| 10,661,680 B2 | 5/2020 | Milton et al. |
| 10,661,844 B2 | 5/2020 | Milton et al. |
| 10,668,807 B2 | 6/2020 | Milton et al. |
| 10,670,191 B2 | 6/2020 | Yeggy |
| 10,688,856 B2 | 6/2020 | Kasai et al. |
| 10,688,857 B2 | 6/2020 | Tsuyuzaki et al. |
| 10,696,251 B2 | 6/2020 | Muramatsu et al. |
| 10,703,416 B2 | 7/2020 | Okura et al. |
| 10,752,102 B2 | 8/2020 | Lampsa et al. |
| 10,823,333 B2 | 11/2020 | Criel et al. |
| 10,899,214 B2 | 1/2021 | Sloan et al. |
| 11,040,610 B2 | 6/2021 | Sloan et al. |
| 11,043,707 B2 | 6/2021 | Sloan et al. |
| 11,043,714 B2 | 6/2021 | Sloan et al. |
| 11,110,786 B2 | 9/2021 | Loacker |
| 11,155,148 B2 | 10/2021 | Chung et al. |
| 11,312,221 B2 | 4/2022 | Sloan et al. |
| 11,345,331 B2 | 5/2022 | McKibben et al. |
| 11,498,435 B2 | 11/2022 | Herbert et al. |
| 11,652,250 B2 | 5/2023 | Sloan et al. |
| 11,718,194 B2 | 8/2023 | Miler |
| 11,772,474 B2 | 10/2023 | Sloan et al. |
| 11,776,335 B1 | 10/2023 | Schubert et al. |
| 11,780,337 B2 | 10/2023 | Sloan et al. |
| 2004/0134699 A1 | 7/2004 | Shimizu |
| 2004/0178602 A1 | 9/2004 | King et al. |
| 2004/0231831 A1 | 11/2004 | Houck et al. |
| 2005/0162015 A1 | 7/2005 | Yamaguchi et al. |
| 2005/0218136 A1 | 10/2005 | Kotani et al. |
| 2006/0102398 A1 | 5/2006 | Mizuno |
| 2007/0092764 A1 | 4/2007 | Kobayashi |
| 2008/0169139 A1 | 7/2008 | Kramer |
| 2008/0169144 A1 | 7/2008 | DeGrave et al. |
| 2008/0225483 A1 | 9/2008 | Kahn et al. |
| 2008/0258682 A1 | 10/2008 | Li |
| 2009/0136844 A1 * | 5/2009 | Watanabe .......... H01M 10/058 |
| | | 429/210 |
| 2009/0201650 A1 | 8/2009 | Hauser et al. |
| 2010/0000816 A1 | 1/2010 | Okada |
| 2010/0062329 A1 | 3/2010 | Muis |
| 2010/0065344 A1 | 3/2010 | Collings, III |
| 2010/0112843 A1 | 5/2010 | Heichal et al. |
| 2010/0163326 A1 | 7/2010 | Takamura et al. |
| 2010/0175940 A1 | 7/2010 | Taneda et al. |
| 2010/0320012 A1 | 12/2010 | Stappen et al. |
| 2011/0068622 A1 | 3/2011 | Ikeno et al. |
| 2011/0114398 A1 | 5/2011 | Bianco |
| 2011/0260530 A1 | 10/2011 | Steffka et al. |
| 2011/0287287 A1 | 11/2011 | Kang |

(56) References Cited

U.S. PATENT DOCUMENTS

| | | |
|---|---|---|
| 2012/0055725 A1 | 3/2012 | Mizoguchi et al. |
| 2012/0090907 A1 | 4/2012 | Storc et al. |
| 2012/0103714 A1 | 5/2012 | Choi et al. |
| 2012/0160583 A1 | 6/2012 | Rawlinson |
| 2012/0175177 A1 | 7/2012 | Lee et al. |
| 2012/0255799 A1 | 10/2012 | Kohler et al. |
| 2012/0312612 A1 | 12/2012 | Harrision, III et al. |
| 2013/0001384 A1 | 1/2013 | Karlsson et al. |
| 2013/0065099 A1 | 3/2013 | Mishima |
| 2013/0108404 A1 | 5/2013 | Okumura et al. |
| 2013/0108897 A1 | 5/2013 | Christian et al. |
| 2013/0248268 A1 | 9/2013 | Matsuda et al. |
| 2014/0141288 A1 | 5/2014 | Kim et al. |
| 2014/0287284 A1 | 9/2014 | Shibata |
| 2014/0338999 A1 | 11/2014 | Fujii et al. |
| 2014/0367183 A1 | 12/2014 | Matsuda |
| 2015/0194712 A1 | 7/2015 | He et al. |
| 2015/0291056 A1 | 10/2015 | Nozaki |
| 2016/0079795 A1 | 3/2016 | Patterson et al. |
| 2016/0087256 A1 | 3/2016 | Wagner et al. |
| 2016/0190526 A1 | 6/2016 | Yamada et al. |
| 2016/0226041 A1 | 8/2016 | Jackson et al. |
| 2016/0297283 A1 | 10/2016 | Sakamoto et al. |
| 2017/0012506 A1 | 1/2017 | Naito et al. |
| 2017/0225558 A1 | 8/2017 | Newman et al. |
| 2017/0282709 A1 | 10/2017 | Sasaki et al. |
| 2017/0320382 A1 | 11/2017 | Milton et al. |
| 2018/0022389 A1 | 1/2018 | Kageyama et al. |
| 2018/0062125 A1 | 3/2018 | Kaneshige |
| 2018/0145382 A1 | 5/2018 | Harris et al. |
| 2018/0183118 A1 | 6/2018 | Harris et al. |
| 2018/0190960 A1 | 7/2018 | Harris et al. |
| 2018/0201110 A1 | 7/2018 | Yin et al. |
| 2018/0319263 A1 | 11/2018 | Hegewald et al. |
| 2018/0333905 A1 | 11/2018 | Tong et al. |
| 2018/0339594 A1 | 11/2018 | Brown et al. |
| 2018/0370368 A1 | 12/2018 | Kronsteiner et al. |
| 2019/0036181 A1 | 1/2019 | Tokozakura et al. |
| 2019/0061505 A1 | 2/2019 | Cavus et al. |
| 2019/0074495 A1 | 3/2019 | Haeusler et al. |
| 2019/0074497 A1 | 3/2019 | Haeusler et al. |
| 2019/0081298 A1 | 3/2019 | Matecki et al. |
| 2019/0084397 A1 | 3/2019 | Yugami et al. |
| 2019/0181517 A1 | 3/2019 | Kellner et al. |
| 2019/0202312 A1 | 7/2019 | Aufdencamp |
| 2019/0202429 A1* | 7/2019 | Richter .............. B60K 6/48 |
| 2019/0229314 A1 | 7/2019 | Ribbentrop et al. |
| 2019/0263449 A1 | 8/2019 | Ta et al. |
| 2019/0291560 A1 | 9/2019 | Lampsa et al. |
| 2019/0296541 A1 | 9/2019 | Mensch et al. |
| 2019/0302764 A1 | 10/2019 | Smith et al. |
| 2019/0326573 A1 | 10/2019 | Ozawa et al. |
| 2019/0393571 A1 | 12/2019 | Weicker et al. |
| 2020/0002828 A1 | 1/2020 | Mills et al. |
| 2020/0083573 A1 | 3/2020 | Caliskan et al. |
| 2020/0088299 A1 | 3/2020 | Baumer et al. |
| 2020/0094669 A1 | 3/2020 | DeLizo et al. |
| 2020/0139808 A1 | 5/2020 | Rike |
| 2020/0152938 A1 | 5/2020 | Winger et al. |
| 2020/0156500 A1 | 5/2020 | Huff et al. |
| 2020/0157769 A1 | 5/2020 | Huff et al. |
| 2020/0180848 A1 | 6/2020 | Snyder et al. |
| 2020/0247225 A1 | 8/2020 | Kochi et al. |
| 2020/0369228 A1 | 11/2020 | Kageyama et al. |
| 2020/0384854 A1 | 12/2020 | Sloan et al. |
| 2020/0406777 A1 | 12/2020 | Nguyen et al. |
| 2021/0036649 A1 | 2/2021 | Iwazaki |
| 2021/0094400 A1 | 4/2021 | Loacker et al. |
| 2021/0155224 A1 | 5/2021 | McKibben et al. |
| 2021/0213821 A1 | 7/2021 | Sloan et al. |
| 2021/0218101 A1 | 7/2021 | Menon et al. |
| 2022/0021050 A1 | 1/2022 | Sloan et al. |
| 2022/0021056 A1 | 1/2022 | Sloan et al. |
| 2022/0242215 A1 | 8/2022 | Sloan et al. |
| 2022/0274494 A1 | 9/2022 | McKibben et al. |
| 2022/0388392 A1 | 12/2022 | Abbott |
| 2023/0126938 A1 | 4/2023 | Takaguchi et al. |
| 2023/0311597 A1 | 10/2023 | McKibben et al. |
| 2023/0318084 A1 | 10/2023 | Sloan et al. |
| 2023/0406086 A1 | 12/2023 | Sloan et al. |
| 2023/0415587 A1 | 12/2023 | Sloan et al. |

FOREIGN PATENT DOCUMENTS

| | | |
|---|---|---|
| CN | 103863080 | 6/2014 |
| CN | 104993151 | 10/2015 |
| CN | 105438262 | 3/2016 |
| CN | 107848386 | 3/2018 |
| CN | 217270085 | 8/2022 |
| DE | 101 08 713 A1 | 9/2002 |
| DE | 10 2006 009 189 | 7/2007 |
| DE | 10 2011 109 024 | 1/2013 |
| DE | 10 2012 109062 | 3/2014 |
| DE | 10 2013 000112 | 3/2014 |
| EP | 1 577 143 A1 | 9/2005 |
| EP | 2 008 917 | 12/2008 |
| EP | 2 554 420 | 5/2014 |
| EP | 2 712 748 B1 | 5/2017 |
| EP | 2 712 788 | 2/2020 |
| EP | 3 640 123 A1 | 4/2020 |
| ES | 1079022 | 4/2013 |
| GB | 491788 | 9/1938 |
| GB | 527052 | 10/1940 |
| GB | 744973 A | 2/1956 |
| GB | 2546535 A | 7/2017 |
| GB | 2555906 | 5/2018 |
| JP | 2004-142524 | 5/2004 |
| JP | 2008-265685 | 11/2008 |
| JP | 2010-100207 | 5/2010 |
| JP | 2014-069686 | 4/2014 |
| KR | 10-1998-0035495 | 8/1998 |
| KR | 10-2017-0000950 | 1/2017 |
| KR | 10-2549321 | 6/2023 |
| WO | WO 2014/044618 | 3/2014 |
| WO | WO 2016/210329 | 12/2016 |
| WO | WO 2018/123337 | 7/2018 |
| WO | WO 2020/041630 | 2/2020 |
| WO | WO 2020/215018 | 10/2020 |
| WO | WO 2020/215023 | 10/2020 |
| WO | WO 2021/108429 | 6/2021 |
| WO | WO 2022/092994 | 5/2022 |
| WO | WO 2022/125929 | 6/2022 |
| WO | WO 2023/027959 | 3/2023 |
| WO | WO 2023/027960 | 3/2023 |
| WO | WO 2023/027961 | 3/2023 |
| WO | WO 2023/027965 | 3/2023 |

OTHER PUBLICATIONS

Tuma, "How to store lithium ion battery cell pack in electric bus?", dated Jul. 3, 2019, in 7 pages.
Tuma, Sliding Rails for Ebus Lithium Battery Pack Tray Automatic Bus Door Opening Mechanism, dated Aug. 15, 2019, in 3 pages.

* cited by examiner

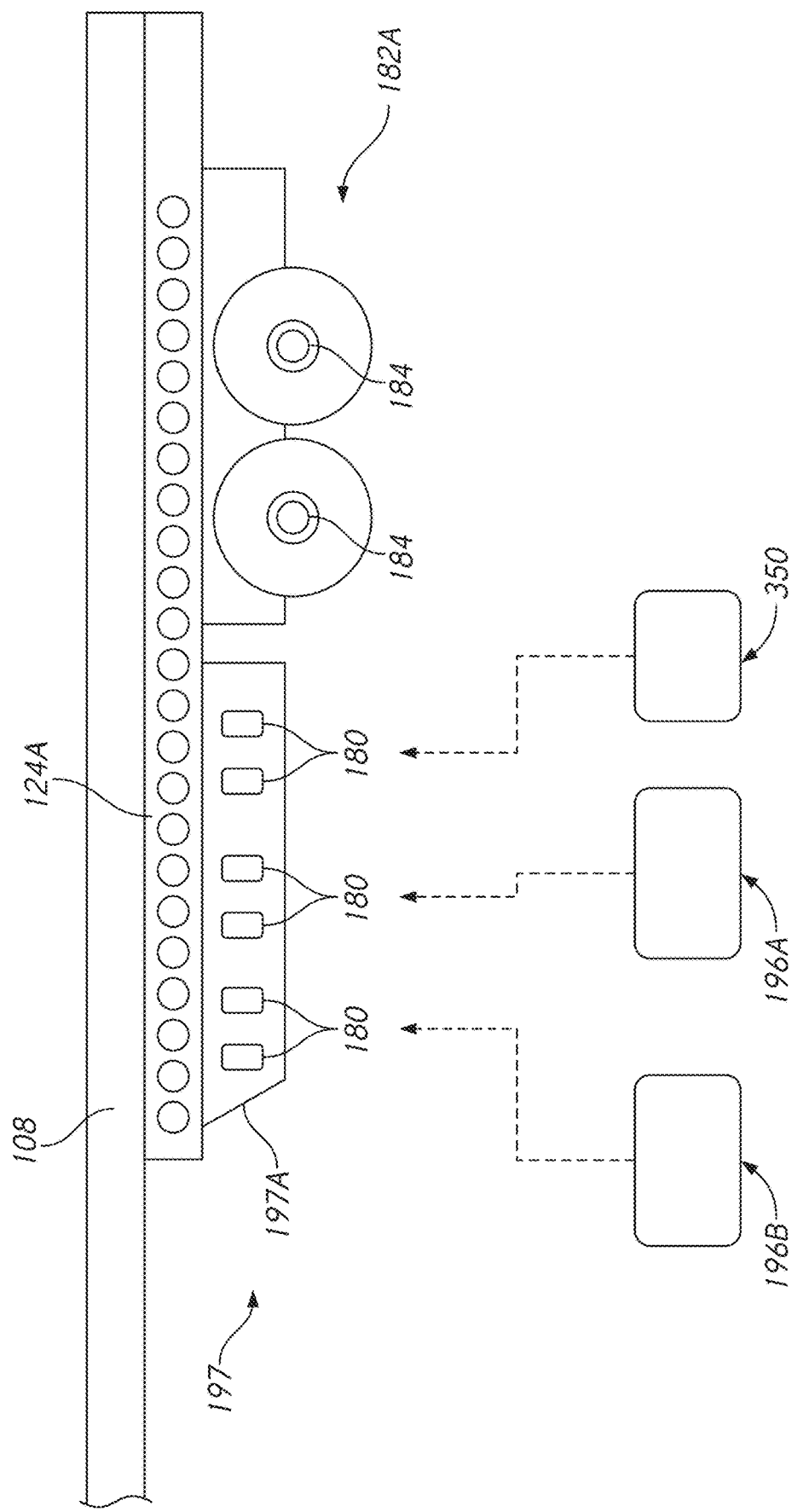

BATTERY AND AUXILIARY COMPONENTS FOR VEHICLE TRAILER

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 C.F.R. § 1.57.

BACKGROUND OF THE INVENTION

Field of the Invention

This application is directed to efficient and convenient assemblies and methods for improving range and efficiency of use of battery powered cargo vehicles.

Description of the Related Art

Class 8 trucks and other large overland shipping vehicles convey large amounts of goods in economies around the world to point of distribution, sale or use. Such trucks often include a tractor that can be detachably connected to a trailer unit. The trailer unit may be referred to as a dry van for use in conveying non-perishable goods. The trailer unit may have a refrigerated compartment to keeps perishable goods cool. A trailer is sometimes constructed with a frame that supports axles, wheels, and suspension as well as a van body that can enclose the goods to protect them en route.

Large shipping vehicles have been powered by fossil fuel combustion engines burning diesel and more recently natural gas. Natural gas improves emissions performance and provides other benefits to users. Electric motor propulsion provides another alternative to fossil fuel burning combustion engines that can further reduce cargo vehicle emissions.

SUMMARY OF THE INVENTION

Large vehicles and vehicle designs could be repurposed for lower emission performance, such as natural gas or electric motor propulsion. It may be beneficial to couple a battery storage unit with a trailer unit, e.g., coupled external to a cargo space on a lower chassis component. Large cargo battery electric vehicles require significant power storage and may have to be taken off-line for significant amount of time for charging powertrain battery assemblies.

In one embodiment, a cargo trailer assembly is provided that includes a van assembly, an axle assembly, a frame member bracket, and a battery assembly. The van assembly includes a floor structure configured to support cargo placed thereon and an enclosure coupled to the floor structure and surrounding a volume to enclose cargo. The van assembly includes a first body rail and a second body rail. The first and second body rails extend along a longitudinal axis of the van assembly configured to support the floor structure. The axle assembly has an axle bearing and a suspension system. The axle assembly can include a first slider rail that extends along the longitudinal axis of the cargo trailer assembly and a second slider rail that extends along the longitudinal axis. Each of the first slider rail and the second slider rail can include a first portion, a second portion configured to be disposed forward of the first portion on the cargo trailer assembly, and a third portion configured to be disposed rearward of the first portion. The frame member bracket can be coupled with the second portion of each of the slider rails. The battery assembly has a housing and a mount system. The housing encloses a plurality of battery units. The housing has a first lateral portion, a second lateral portion and a central portion. The mount system includes a first housing bracket configured to couple with the frame member bracket coupled with the second portion of the first slider rail. The mount system includes a second housing bracket configured to couple with the frame member bracket coupled with the second portion of the second slider rail.

In some variations, the cargo trailer assembly also includes an auxiliary component assembly. The auxiliary component assembly can be configured to couple with the third portion of one or both of the first and second slider rails. The auxiliary component assembly can enclose and support one or more systems of a component of an electric powertrain, e.g., a battery assembly, a control module for a refrigeration unit, a range extender component or other electrical component of a vehicle.

In another embodiment, a cargo trailer assembly is provided that includes a van assembly that includes a chassis comprising a plurality of body rails and an enclosure supported by the chassis. The cargo trailer assembly also includes an axle assembly, a stop member, and an actuator. The axle assembly has a plurality of slider rails moveably coupled with the body rails of the van assembly. The stop member is configured to selectively engage and disengage the body rails. The actuator is configured to selectively engage the stop member with and disengage the stop member from the body rails. In some implementations trailer assembly includes an auxiliary component assembly. The auxiliary component assembly can be configured to couple with one or more slider rails. The auxiliary component assembly is configured to remotely operate the actuator.

In another embodiment, a cargo trailer assembly is provided that includes a chassis, a slider assembly, and a battery assembly. The chassis has a first body rail that extends along a longitudinal axis of the cargo trailer assembly and a second body rail. The second body rail also can extend along the longitudinal axis of the cargo trailer assembly. The slider assembly has a first slider rail slideably coupled with the first body rail and a second slider rail slideably coupled with the second body rail. The slider assembly is configured to adjustably couple the first slider rail and the second slider rail to the first body rail and the second body rail to allow for a change in a fore-aft position of the slider assembly relative to the chassis. The battery assembly has a housing and a mount system. The housing encloses a plurality of battery units. The mount system is configured to couple the battery assembly with at least one of the slider rails.

In another embodiment, a trailer mountable power storage and distribution system is provided. The power storage and distribution system includes a battery assembly and an auxiliary component assembly. The battery assembly includes a housing and a battery assembly mount system. A plurality of battery units are enclosed within the housing. The mount system is configured to couple the battery assembly with a chassis assembly of a trailer unit. The auxiliary component assembly has a first component module, a second component module, and an auxiliary component assembly mount system. The component assembly mount system is configured to couple the auxiliary component assembly with the chassis assembly of the trailer unit. The first component module has a thermal management component configured to remove heat from the battery assembly. The second component module has a power distribution unit configured to electrically connect the battery assembly to a load disposed on a tractor configured to tow the trailer unit.

BRIEF DESCRIPTION OF THE DRAWINGS

Features of the invention can be better understood from the following detailed description when read in conjunction with the accompanying schematic drawings, which are for illustrative purposes only. The drawings include the following figures:

FIG. 6A is a schematic view of another slider assembly allowing relative movement between one or more battery assemblies and wheels of a cargo trailer assembly;

DETAILED DESCRIPTION OF THE PREFERRED EMBODIMENT

While the present description sets forth specific details of various embodiments, it will be appreciated that the description is illustrative only and should not be construed in any way as limiting. Furthermore, various applications of such embodiments and modifications thereto, which may occur to those who are skilled in the art, are also encompassed by the general concepts described herein. Each and every feature described herein, and each and every combination of two or more of such features, is included within the scope of the present invention provided that the features included in such a combination are not mutually inconsistent.

Figure 1:
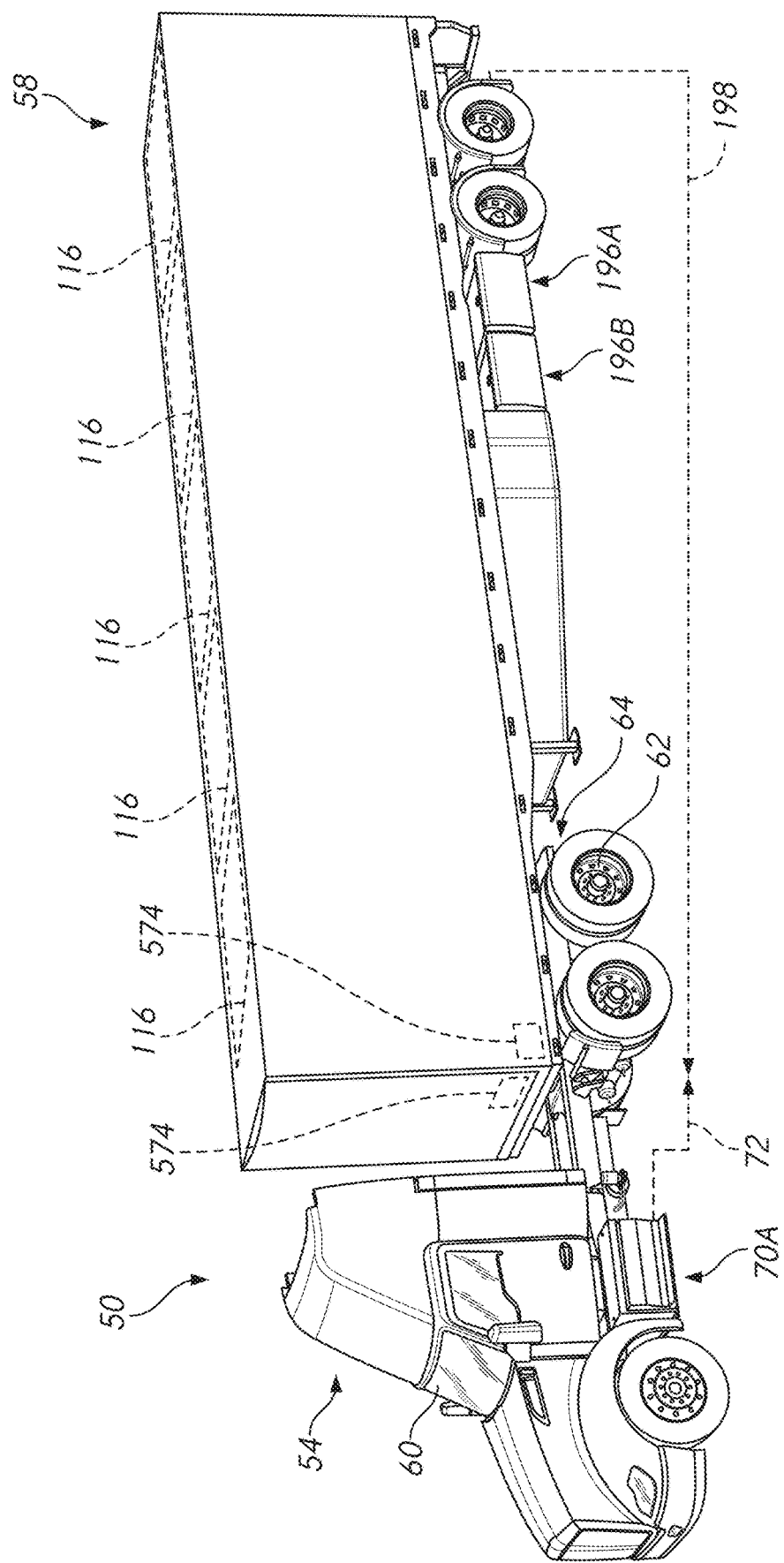
FIG. 1 is a perspective view of a Class 8 truck or similar heavy-duty cargo vehicle having a tractor and a trailer unit.

This application is directed to novel vehicle assemblies that provide advantageous electric powertrain features and functions. For example, FIG. 1 shows a truck 50 that has a tractor 54 and a trailer unit 58. The trailer unit 58 is a cargo trailer assembly that can be attachable to and detachable from the tractor 54. The tractor 54 includes a cab 60 within which an operator can operate the truck 50. The tractor 54 includes one or more axles 62. In some embodiments, the truck 50 is a battery electric vehicle and the tractor 54 is equipped with a battery assembly 70A. The battery assembly 70A can store electric power to supply current to one or more electric motor 64 disposed on the tractor 54 and engaged with the axles 62. Details of various embodiments of battery assemblies are discussed below in connection with FIG. 7. Various embodiments of a trailer mountable power storage and distribution system 498 (discussed in detail below in connection with FIGS. 9 and 10) are provided to enhance the capabilities of the truck 50. As explained further below the trailer mountable power storage and distribution system 498 can greatly extend the range of the truck 50. The system 498 is modular allowing the amount of range extension to be selected based on the application, such as based on a combination of the distance to be traveled by the truck 50, the route, the load, the ambient conditions, and other factors. The system 498 also facilitates charging batteries on the trailer unit 58 while the tractor 54 can remain in service. The system 498 also provides other convenient functions, such as exporting power, providing for location tracking, assisting the driver in properly balancing the weight of the trailer unit 58 and the load carried therein, and other functions discussed below.

FIG. 1 shows that the battery assembly 70A can be coupled with a high voltage conveyance 72 that is configured to be coupled with a high voltage conveyance 198 at least partially disposed on the trailer unit 58. The high voltage conveyance 72 and the high voltage conveyance 198 are shown as dashed lines outside the body of the truck 50 but would be routed at least partially beneath the cab 60 and/or along frame member of the chassis of the truck 50 and/or the chassis of the tractor 54 as discussed below. Providing two separate conveyances on the tractor 54 and the trailer unit 58 facilitates using the tractor 54 with many different trailer units. This allows the trailer unit 58 to be taken out of service for unloading while the truck 50 can be coupled with another trailer unit 58 and sent back out on the road. A non-separable conveyance could be provided in a dedicated trailer unit situation.

The high voltage conveyance 198 can convey current between the battery assembly 70A and a part of an electric powertrain system disposed on the trailer unit 58. For example the battery assembly 70A could be operationally coupled with a battery assembly 196A disposed on the trailer unit 58. The battery assembly 196A can provide high voltage current to the battery assembly 70A, e.g., as direct supply to the electric motor 64 or to replenish power stored in the battery assembly 70A. In some applications, a power distribution system is provided that selects between drawing current from the battery assembly 70A and the battery assembly 196A (or another battery assembly on the truck 50). The high voltage conveyance 72 can have a first branch leading to the battery assembly 70A and a second branch extending to another load such as the electric motor 64.

Figure 4:
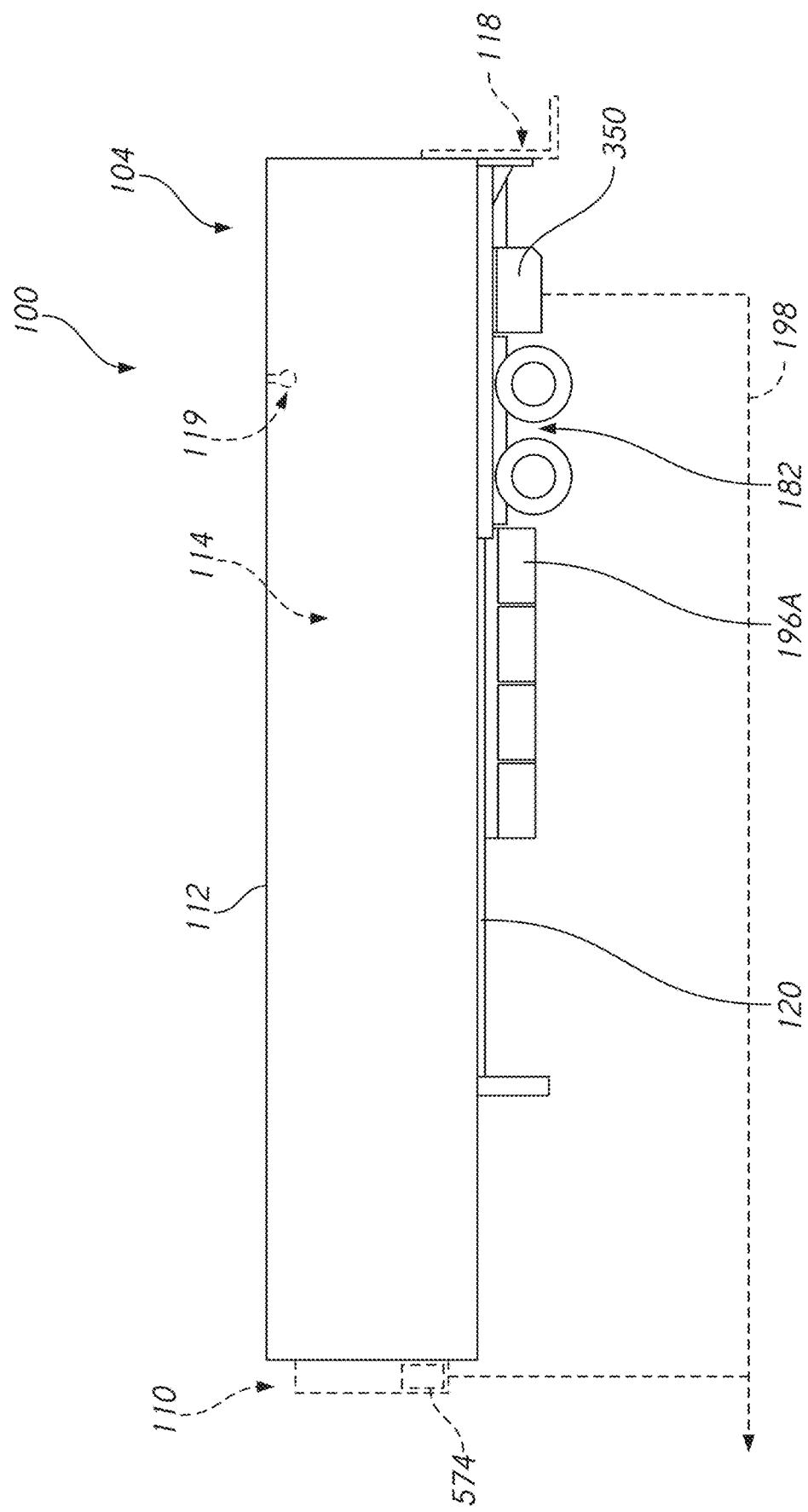
FIG. 4 is a side schematic view of a cargo trailer assembly corresponding to the trailer unit illustrated in FIG. 1.

In one embodiment the high voltage conveyance 198 is coupled to a power distribution system, which can select between providing power through one or more branches of the high voltage conveyance 72 to loads including the electric motor 64 and the battery assembly 70A. The power distribution system can thus select between recharging the battery assembly 70A and providing current to the load. As discussed further below in connection with FIG. 2 a power distribution system can output power in different formats to support loads of different types simultaneously. FIG. 1 illustrates that the trailer unit 58 can be equipped with a second battery assembly 196B. Various embodiments include more than two battery assemblies, e.g., three, four, or more assemblies. FIG. 4 shows an example of placement of up to four battery assemblies. More than four battery assemblies can be provided on the trailer unit 58.

The battery assemblies can be aligned along a longitudinal axis LA of the trailer unit 58 of or a cargo trailer assembly 100 as illustrated in FIG. 4. The cargo trailer assembly 100 can have an array of battery assemblies disposed forward of the wheels thereof.

As will be discussed further below, the trailer unit 58 can be equipped one or more range extending modules. Some range extending modules operate by replenishing power storage in one or more of the battery units on the truck 50, e.g., in one of, more than one of or all of the battery assembly 196A, the battery assembly 196B or the battery assembly 70A. One example of the range extending module includes one or a plurality of solar cells 116 coupled with the trailer unit 58. FIG. 1 schematically illustrates four solar cell 116 disposed on a top side of the roof the trailer unit 58. More or fewer than four solar cells 116 can be provided. In one implementation the entire top surface of the trailer unit 58 is formed as a solar energy capturing roof. The solar cells 116 can be mounted on any surface that may be incident by solar rays, including any of the longitudinal side surfaces or the front or back surfaces of the enclosure structure of the trailer unit 58. The solar cells 116 can be coupled by an electrical conveyance to a power generation junction to convey current generated in the solar cells 116 directly or indirectly to the battery assemblies for storage or other high and/or low voltage loads of the truck 50. The solar cells 116 can indirectly convey power to the battery assemblies via an auxiliary component assembly mounted to the trailer unit 58, as discussed further below.

Figure 2:
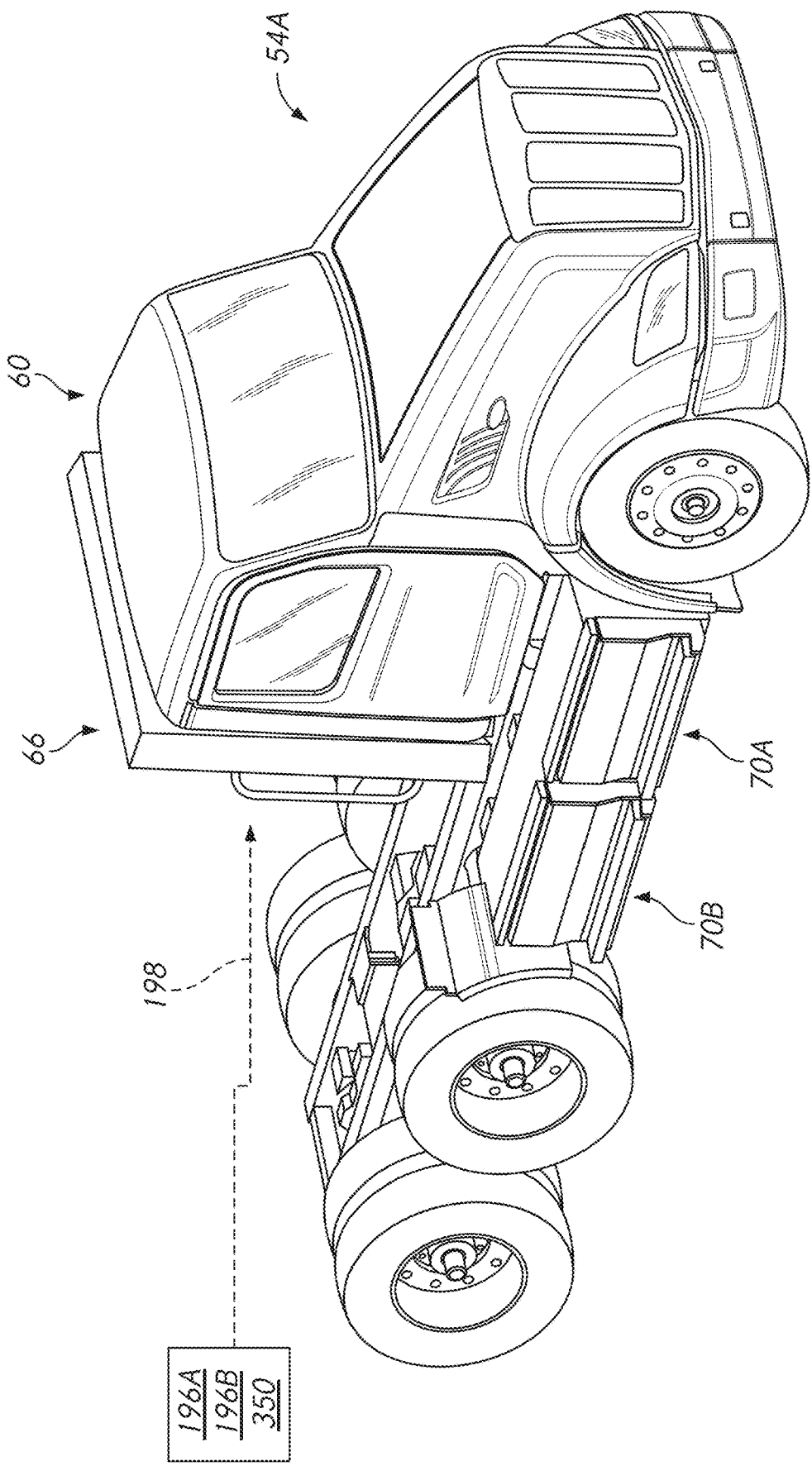
FIG. 2 is a front perspective view of a tractor that can be used with the tractor-trailer truck of FIG. 1, the tractor being equipped with two battery assemblies configured to supply power to an electric powertrain.

FIG. 2 shows a tractor 54A similar to the tractor 54, except as described differently below. The tractor 54A includes a battery assembly 70B in addition to the battery assembly 70A. Providing a second battery assembly provides additional storage capacity and additional redundancy of source of energy for the electric motor 64. The tractor 54A also includes a power distribution module 66. The power distribution module 66 is one implementation of the power distribution system described above. The power distribution module 66 can provide electrical communication between the tractor 54A and the trailer unit 58. The power distribution module 66 can manage the use of power stored in a plurality of battery assemblies distributed in different parts of the vehicle. As such the power distribution module 66 can be configured to be coupled to the high voltage conveyance 198. The power distribution module 66 can have a junction for connecting the high voltage conveyance of the tractor 54A similar to the high voltage conveyance 72 of the tractor 54. The power distribution module 66 can provide for direct or indirect electrical connection between the high voltage conveyance 198 of the trailer unit 58 and the high voltage conveyance of the tractor 54A.

In some embodiments, the power distribution module 66 has or is coupled with a junction box that can disconnectably connect the high voltage conveyance 198 and the high voltage conveyance 72 to facilitate modular assembly of the electric powertrain components to the truck 50. The power distribution module 66 can receive current from the battery assembly 196A, the battery assembly 196B, the battery assembly 70A, and the battery assembly 70B and can supply the current to a load, including the electric motor 64 or any other electrical component on the tractor 54A or on the trailer unit 58. Each of these power sources and loads can be coupled to a different junction of the junction box if provided. The tractor 54A can be modified by removing power sources and some loads such that some junctions of the power distribution module 66 are not used for some routes on which the tractor 54A is to be operated.

The power distribution module 66 can provide electrical communication between the battery assembly 70A and a high voltage load, such as the electric motor 64. The power distribution module 66 can provide electrical communication between the battery assembly 70A and a low voltage load, including one or more auxiliary components of the tractor 54A or the trailer unit 58. The power distribution module 66 can configure the output of the battery assembly 70A and/or battery assembly 70B for supplying current at an appropriate (e.g., at high or low) voltage to various components. The power distribution module 66 can include one or more inverters to adjust the voltage of the power or to convert from DC to AC power or AC to DC power suitable for a load. The power distribution module 66 can interface between the battery assembly 70A and/or the battery assembly 70B and a charge unit that is external to the truck 50. In some applications, the tractor 54A is equipped with a range extender module, which can include an on-board power generation component. In one example, the power distribution module 66 can include circuitry to receive and distribute and/or store current generated by the solar cell 116. Other range extender modules that can be mounted to the trailer unit 58, the tractor 54, or the tractor 54A and electrically coupled with a battery assembly by way of the power distribution module 66 or another auxiliary component assembly can include a fuel cell or motor driven generator to generate current. Current generated by any one or a combination of these range extender modules can be stored in one or more of the battery assemblies 70A, 70B, 196A, 196B. Additional details of the power distribution module 66 are set forth in US 63/089672, which is hereby incorporated by reference in its entirety for all purposes and is included herewith in an Appendix.

Figure 3:
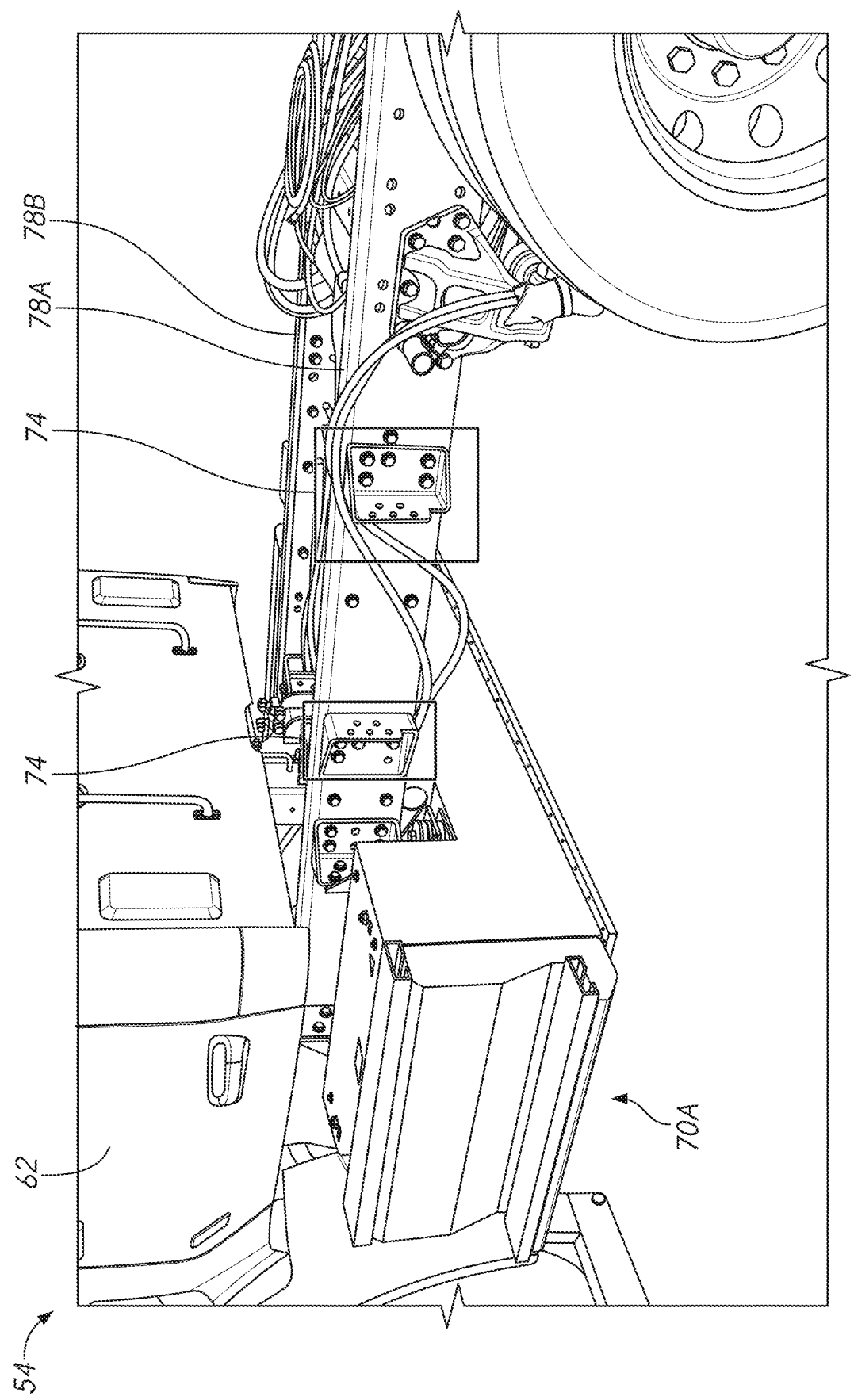
FIG. 3 is a rear perspective detail view of a portion of a chassis of the tractor of FIG. 2 showing frame member brackets that can be coupled with a housing bracket of either of the battery assemblies mounted to the tractor in FIG. 2.

FIG. 3 shows that the tractor 54 can be equipped with one or more frame member brackets 74 to provide for mounting, e.g., upfitting, of the battery assembly 70A or the battery assembly 70B to the tractor 54. The frame member brackets 74 can couple with first longitudinal frame members 78A. The frame member bracket 74 can support the battery assembly 70B (as shown in FIG. 2). In some configurations, the battery assembly 70B is configured to be supported by four frame member bracket 74, with two brackets coupled with the first longitudinal frame member 78A and two with a second longitudinal frame member 78B. The first longitudinal frame member 78A and the second longitudinal frame member 78B are longitudinal frame members of a chassis of the tractor 54. More or fewer than four frame member brackets 74 can support a battery assembly in various embodiments. The frame member bracket 74 can also be mounted to the chassis of the tractor 54A.

FIG. 4 shows a modified embodiment of the trailer unit 58 as a cargo trailer assembly 100. The cargo trailer assembly 100 is similar to the trailer unit 58 in that it can be coupled with the tractors 54, 54A or a similar vehicle drive unit. The cargo trailer assembly 100 can incorporate any feature of the trailer unit 58 discussed above. The cargo trailer assembly 100 includes a van assembly 104 and a floor structure 108 for supporting cargo placed thereon. The cargo can be any goods to be transported. The cargo trailer assembly 100 can be configured as a dry van. The cargo trailer assembly 100 can be configured with a refrigeration unit to maintain a selected temperature within at least a portion of the enclosed space thereof.

In one embodiment, the cargo trailer assembly 100 is equipped with a control module 110. The control module 110 can include some or all of the components and functions of the power distribution module 66. The control module 110 can be detachably coupled with the high voltage conveyance 198. The control module 110 can be coupled with the high voltage conveyance 72. The control module 110 can provide an interface between the cargo trailer assembly 100 and the tractors 54, 54A. In one embodiment, the control module 110 supports components and functions on the cargo trailer assembly 100. The control module 110 can be configured to control the internal temperature of a volume 114 of or a portion the interior of an enclosure 112 coupled to the floor structure 108. The control module 110 can be connected to a high voltage junction 560 of an auxiliary component assembly 350 (discussed below) mounted to the cargo trailer assembly 100. As such, energy stored on the cargo trailer assembly 100 can maintain the temperature of the enclosure 112 even when the cargo trailer assembly 100 is not connected to the tractor 54. For a dry van configuration, the interior volume 114 of the enclosure 112 may not be temperature controlled but rather is responsive to the ambient conditions. The control module 110 can be provided as part of a power distribution system for the trailer unit 58 or the cargo trailer assembly 100 to deliver power to other high and low voltage components thereof.

The cargo trailer assembly 100 can include a chassis 120 providing the structure upon which other components of the cargo trailer assembly 100 can be supported. The chassis 120 can includes the floor structure 108 and also can include one or more body rails. For example, the chassis 120 can include a first body rail 124A and a second body rail 124B. The chassis 120 of the cargo trailer assembly 100 is discussed in further detail below in connection with FIGS. 5-6A.

FIG. 4 shows that the cargo trailer assembly 100 can be supported by an axle assembly 182 coupled with the first body rail 124A and/or the second body rail 124B. The axle assembly 182 is an example of a slider assembly that can allow movement of ground contacting components, e.g., the wheels, and other components coupled therewith to move relative to the van assembly 104. As discussed further below in connection with FIG. 8, the axle assembly 182 can include an axle bearing 184 and a suspension system 186. The suspension system 186 can include a leaf-spring 188, an air bag suspension, or another form of a suspension system.

In one arrangement the battery assembly 196A is coupled with the axle assembly 182. The battery assembly 196A can be located in front of an axle supported by the axle bearing 184. A second battery assembly 196B illustrated in FIG. 1 can be provided forward of the axle bearing 184 and also forward of the battery assembly 196A. In another embodiment at least a third and a fourth battery assembly (shown in grey/dashed lines) can be provided forward of the axle bearing 184 and forward of the battery assembly 196B. The cargo trailer assembly 100 can be coupled with more than four battery assemblies depending on the range and route needs.

Figure 9:
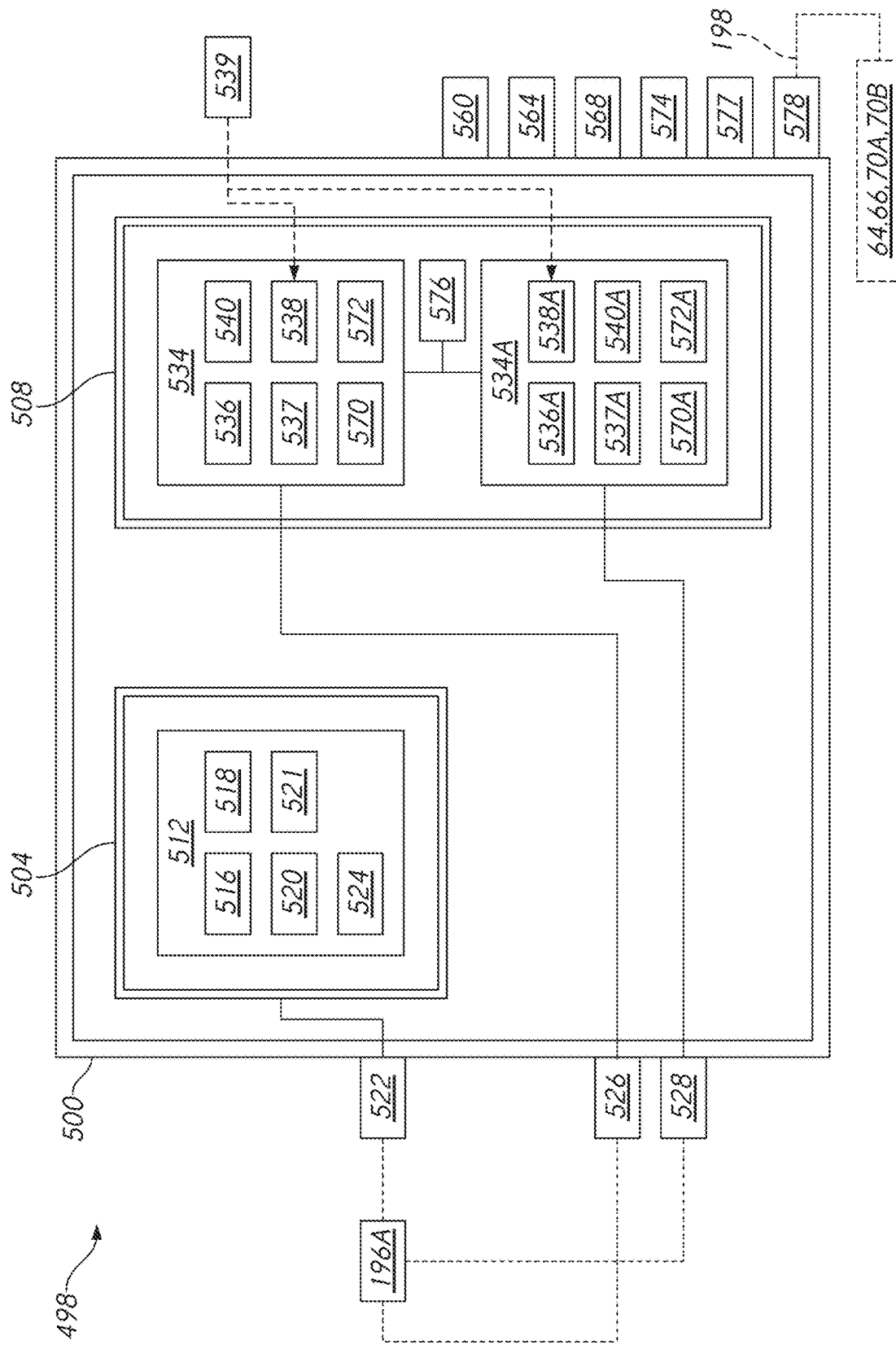
FIG. 9 is a schematic view of components of an embodiment of a trailer mountable power storage and distribution system including an auxiliary component assembly configured to support thermal management and/or electrical communication of power on a tractor-trailer vehicle similar to that of FIG. 1.

The cargo trailer assembly 100 can include an auxiliary component assembly 350. The auxiliary component assembly 350 can be included in a trailer mountable power storage and distribution system 498, discussed below. The auxiliary component assembly 350 can be coupled with the axle assembly 182. The auxiliary component assembly 350 can be disposed rearward of an axle supported by the axle bearing 184. FIG. 9 illustrates the components of the auxiliary component assembly 350 in one embodiment. The auxiliary component assembly 350 includes a junction interface providing one or more junctions for providing electrical connection between components thereof and other components external to the auxiliary component assembly 350 e.g., by way of the high voltage conveyance 198 to electrically connect the auxiliary component assembly 350 with one or more components of the truck 50. For example, the auxiliary component assembly 350 can supply current to a load on the tractor 54 with which the cargo trailer assembly 100 is coupled to form the truck 50. The auxiliary component assembly 350 can be connected at the junction interface to a conveyance coupled with the battery assembly 196A and/or the battery assembly 196B and/or additional battery assemblies (if present). The auxiliary component assembly 350 can include one or more inverters and other circuits for configuring and controlling the distribution of power on the cargo trailer assembly 100 or the tractor 54.

The auxiliary component assembly 350 can export current to other components outside the auxiliary component assembly 350. In one embodiment, the auxiliary component assembly 350 can export current at high voltage to a high voltage load, such as the electric motor 64 on the tractor 54 by way of the high voltage conveyance 198. The auxiliary component assembly 350 can export power to another high voltage load on the truck 50. The auxiliary component assembly 350 can output current at high voltage to a high voltage component disposed on the cargo trailer assembly 100. For example, an opening to the enclosure 112 can be equipped with a liftgate 118 configured to operate on a high voltage current. The control module 110 can include a refrigeration unit configured to operate on a high voltage current. These high voltage components can be powered by way of the auxiliary component assembly 350.

The auxiliary component assembly 350 can include components that consume current at low voltage. For example, some of the components of the electrical circuit system 534 (see FIGS. 9-10) can consume current at low voltage. The auxiliary component assembly 350 also can export low voltage current to other components. In one embodiment, the auxiliary component assembly 350 includes a junction for outputting low voltage current. The cargo trailer assembly 100 can include one or more lights 119 for lighting the volume 114 within the enclosure 112. The light 119 can be coupled with a low voltage junction 564 on the auxiliary component assembly 350 for receiving current at low voltage. Other low voltage devices that can be mounted on the cargo trailer assembly 100 and coupled with the low voltage junction 564 can include a global positioning system (GPS) locating component 576.

A GPS locating component 576 can be powered by the current from the battery assembly 196A or the battery assembly 196B. The GPS locating component 576 can beneficially enable the electrical circuit system 534 to provide actionable information to a driver in the tractor 54. For example, the electrical circuit system 534 can receive an input from the GPS locating component 576. The GPS locating component input can be used to determine the country, state or province, county, or other jurisdiction where the cargo trailer assembly 100 is located. The GPS locating component 576 can determine that the cargo trailer assembly 100 has crossed from a prior jurisdiction to another (current) jurisdiction. A user interface in the tractor 54 can inform the driver if the current jurisdiction has different regulations than the prior jurisdiction that require adjustment of the operation of the truck 50, e.g., shifting the by movement of the slider assembly 128 relative to the floor structure 108.

Location information can be combined with the status of the truck 50 or the cargo trailer assembly 100 to provide other recommendations to the driver of the truck 50. An information system can also receive inputs that enable the electrical circuit system 534 to determine the weight of the cargo trailer assembly 100 (including any load therein). For example, a pressure sensor can detect pressure in a suspension system, e.g., pressure in an air bag suspension. In another example, a deflection sensor can detect an amount of compression of a spring or shock absorber component. The weight being supported by the suspension can be determined from a pressure sensor input signal or a deflection sensor input signal. From the determination of weight and the location of the vehicle as determined from the input from the GPS locating component 576, the information system can generate a recommended action. A recommended action can include recommending that the driver confirm that a position of the slider assembly 128 to the floor structure 108 of the cargo trailer assembly 100 is compliant with regulations in the current jurisdiction. In another embodiment, a slider position sensor can provide an input indicating the current position of the slider assembly 128 relative to the floor structure 108. The electrical circuit system 534 can receive one or more of the position sensor input, the GPS location input, and the pressure sensor or spring/shock deflection input and can provide a recommendation to the driver of the truck 50 to adjust the position of the slider assembly 128 relative to the floor structure 108 based on the condition of the vehicle and the local regulations for the current location.

Figure 5:
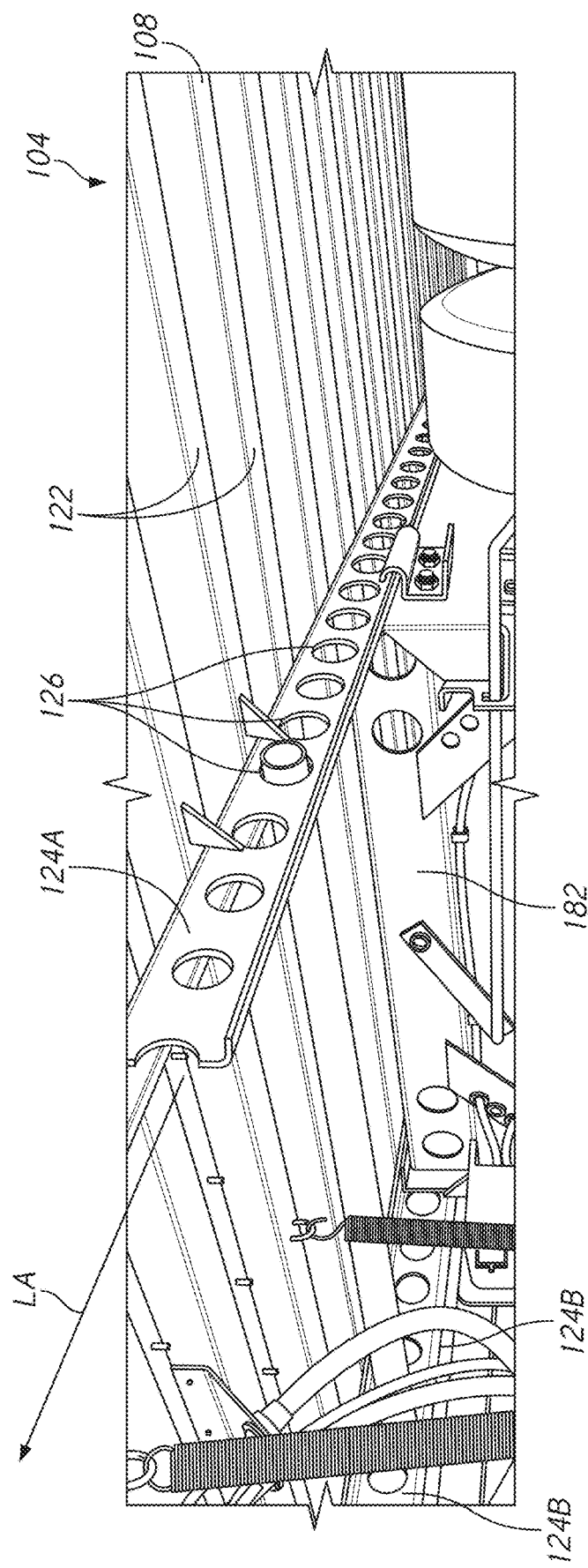
FIG. 5 is a bottom perspective detail view of a portion of a floor structure of a trailer unit assembly illustrating a van assembly including a floor structure and body rails.
Figure 6:
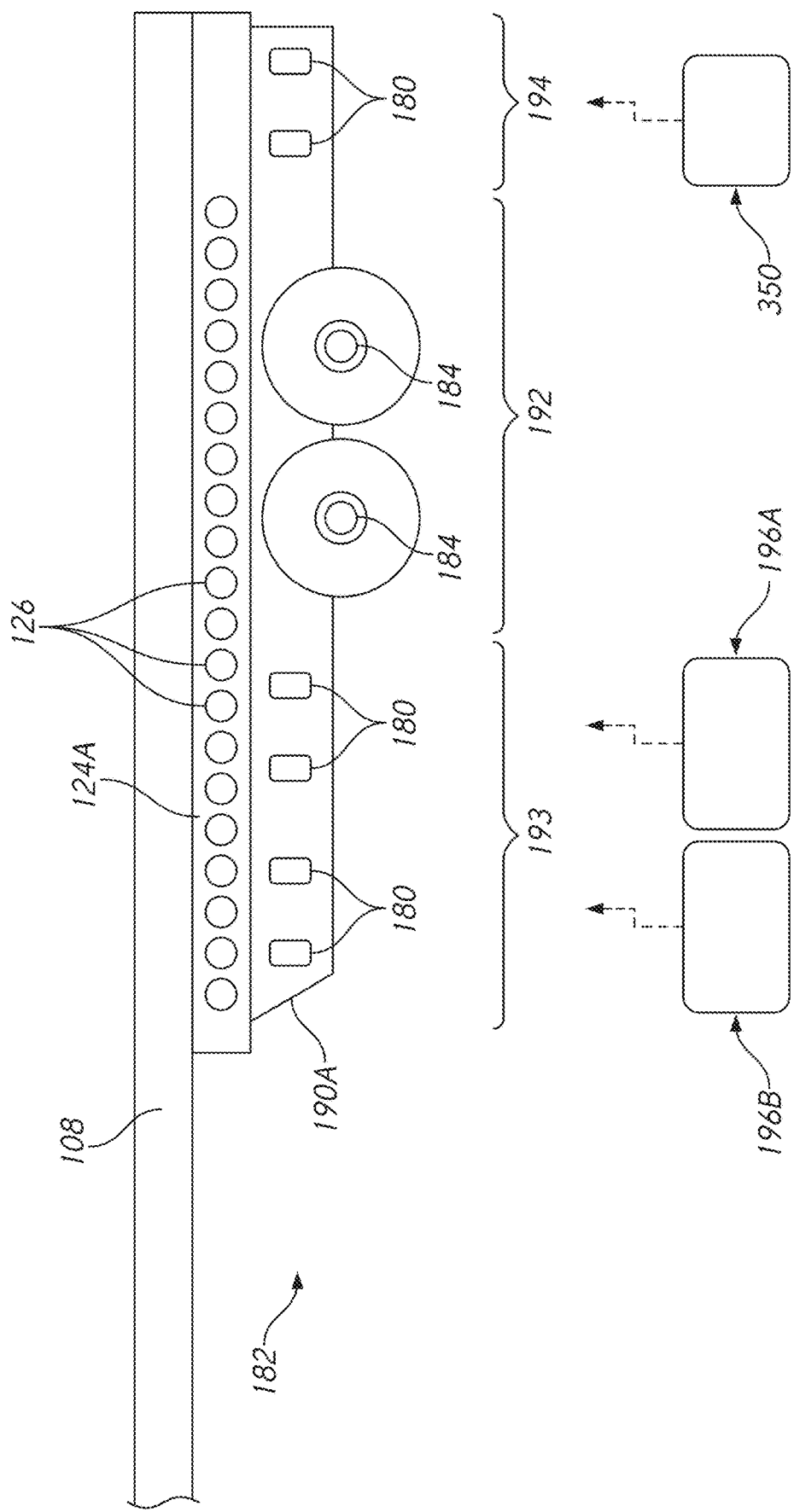
FIG. 6 is a schematic view of a portion of a van assembly illustrating an embodiment in which a slider assembly is configured to be coupled with two battery assemblies and an auxiliary component assembly.

FIGS. 5-6A shows example of how the cargo trailer assembly 100 can be configured to include one or more battery assemblies 196A, 196B and/or an auxiliary component assembly 350. The cargo trailer assembly 100 optionally allows the position of battery assemblies and/or an auxiliary component assembly to be shifted relative to the van assembly 104.

FIG. 5 shows an underside of one embodiment of the van assembly 104 and the floor structure 108 in more detail. In particular the floor structure 108 can include a number of cross-members 122 that can provide support for cargo in the volume 114 of the enclosure 112. The cross-members 122 can be arranged transverse to a longitudinal axis LA of the van assembly 104 or of the cargo trailer assembly 100. The cargo trailer assembly 100 can also include one or more body rails, e.g., a first body rail 124A and a second body rail 124B. The body rails 124A, 124B can extend along the longitudinal axis LA of the cargo trailer assembly 100. The body rails 124A, 124B can extend transverse to the cross-members 122. The body rails 124A, 124B can located below or can extend below the cross-members 122. One or both of the body rails 124A, 124B can include an array of openings 126 disposed in a lengthwise direction thereof. The openings 126 (discussed further in connection with FIGS. 6-7) allow the position of the van assembly 104 to be shifted relative to the wheels of the cargo trailer assembly 100.

FIG. 6 shows an embodiment of the cargo trailer assembly 100 with focus on the structure at and beneath the floor structure 108. The axle assembly 182 is coupled with the floor structure 108. The axle assembly 182 can be configured to be rigidly connected to the floor structure 108 to provide a fixed and constant relative position between the axle assembly 182 and the enclosure 112. In other embodiments the axle assembly 182 can move forward and rearward (fore and aft) relative to the enclosure 112.

Figure 8:
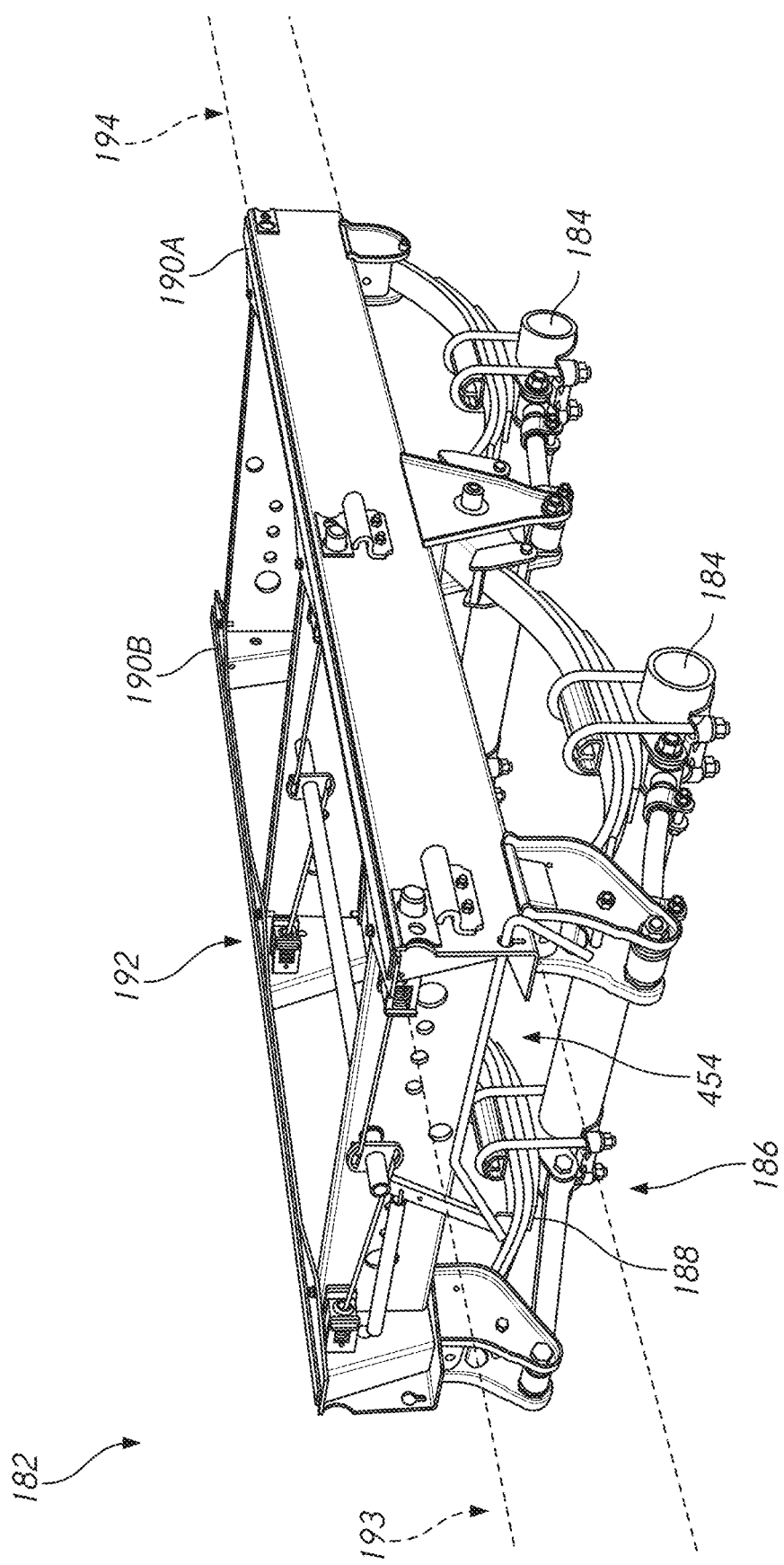
FIG. 8 is a perspective view of an axle assembly, sometimes referred to as a bogie.

In one embodiment the axle assembly 182 includes a first slider rail 190A and a second slider rail 190B (see FIG. 8). The first slider rail 190A and the second slider rail 190B can be slideably coupled with the first body rail 124A and the second body rail 124B respectively to allow the fore-aft position of the floor structure 108 to be adjusted relative to the axle assembly 182. The floor structure 108 can be shifted forward relative to the position of the axle assembly 182. The floor structure 108 can be shifted rearward relative to the position of the axle assembly 182.

FIG. 8 shows an example of a mechanism for allowing or preventing movement of the floor structure 108 relative to the axle assembly 182. The axle assembly 182 includes a stop member 450 coupled with one or both of the first slider rail 190A and the second slider rail 190B. The stop member 450 can be extended away from, e.g., transverse to, the longitudinal axis LA of the cargo trailer assembly 100 to cause each of the stop member 450 to engage at least one of the openings 126 in at least one of the first body rail 124A and the second body rail 124B. The stop member 450 can be retracted toward, e.g., transverse to, the longitudinal axis LA by operation of the actuator 454. The actuator 454 can enable remote actuation, as discussed further below.

FIG. 6 shows further details of the axle assembly 182, which includes axle bearings 184 rotatably supporting axles coupled with wheels. The first slider rail 190A includes a first portion 192, a second portion 193 configured to be disposed forward of the first portion 192. The first slider rail 190A includes a third portion 194 configured to be disposed rearward of the first portion 192. The first portion 192 comprises a portion of the first slider rail 190A along which the axle bearings 184 (and axles and wheels supported thereby) are disposed and supported. The second portion 193 is a forward extension of sufficient length to enable coupling with one of the battery assemblies 196A, 196B, e.g., by way of two or more frame member brackets 180. The second portion 193 can have a length of about three feet to about nine feet, about three feet to about twelve feet, about three feet to about sixteen feet, about three feet to about twenty feet, about five feet, about nine feet, about twelve fee, about sixteen feet, or about twenty feet in various embodiments.

FIG. 6 shows one embodiment in which the second portion 193 is coupled with two sets of two frame member brackets 180. The second portion 193 of the second slider rail 190B also can be configured to have two sets of two frame member bracket 180 coupled with a portion thereof disposed forward of the location of the axle bearing 184 coupled therewith. The battery assembly 196A can be configured to mate with the frame member brackets 180 disposed closest to the axle bearing 184, e.g., at a rearward position of the second portion 193. The battery assembly 196B can be configured to mate with the frame member brackets 180 disposed forward of the rearward position of the second portion 193. The battery assembly 196B can be couple with frame member bracket 180 disposed adjacent to the forward end of the first slider rail 190A.

As discussed above in connection with FIG. 4 the cargo trailer assembly 100 can include the capability to support more than two battery assemblies. FIG. 4 illustrates the ability to support four battery assemblies. The second portion 193 of the first slider rail 190A and the second slider rail 190B would be further extended to enable support of more than two battery assemblies. In one embodiment illustrated by FIGS. 4 and 6, four sets of frame member brackets 180 (e.g., eight brackets) can be disposed along the second portion 193 of the slider rails 190A, 190B forward of the axle bearings 184.

The third portion 194 of the first slider rail 190A (and a corresponding portion of third portion of the second slider rail 190B) can also be extended by a sufficient amount to allow the auxiliary component assembly 350 to be supported thereon rearward of the axle bearing 184. The third portion 194 can have a length of about two feet to about five feet in various embodiments. The third portion 194 can be configured to couple with one, two, or more than two frame member bracket 180. The third portion 194 can have two frame member brackets 180 coupled therewith, the frame member brackets being configured to support the auxiliary component assembly 350. The auxiliary component assembly 350 can have an underslung configuration whereby a first lateral portion is coupled with an outside surface of the third portion 194 of the first slider rail 190A and a second lateral portion is coupled with an outside surface of the second slider rail 190B across the longitudinal axis LA of the cargo trailer assembly 100. A central portion of the auxiliary component assembly 350 can be coupled with first and second lateral portions. The lateral portions and central portion can be defined by a frame member 500 (shown schematically in FIG. 9). One or a plurality of components can be coupled with the frame member 500 as discussed further below. Components of the auxiliary component assembly 350 can be enclosed in a housing coupled with the frame 500. The housing can couple to the first slider rail 190A and/or the second slider rail 190B by way of a mount system that includes one or more vibration isolating components. One or both of the first vibration isolator 264 and the first vibration isolator 268 (discussed below in connection with the battery assembly 196A) can be provided between the auxiliary component assembly 350 and the chassis 120 of the cargo trailer assembly 100.

The foregoing bracket structure enables the battery assembly 196A, battery assembly 196B and the auxiliary component assembly 350 to be upfitted to the axle assembly 182 to be coupled with the first slider rail 190A, second slider rail 190B. FIG. 6 illustrates upfitting by dashed line arrows and in general entails raising these components or modules from below the fully assembled trailer unit to couple the components/modules on an as needed basis. The array of frame member brackets 180 and the length of the second portion 193 allow the number of battery assemblies coupled with the axle assembly 182 to be determined for a particular use of the cargo trailer assembly 100 and even for each route contemplated to be taken by the truck 50 incorporating the cargo trailer assembly 100.

The frame member bracket 180 can be of the same configuration as the frame member bracket 74. In one embodiment of the cargo trailer assembly 100 the frame member bracket 180 are of the same design for supporting the battery assembly 196A, the battery assembly 196B and the auxiliary component assembly 350. The frame member bracket 180 are configured to mate with housing brackets of the battery assemblies discussed further below. In some embodiments, the auxiliary component assembly 350 are supported by modified brackets that can be lighter duty to support less weight than the brackets for the battery assemblies where the overall weight of the auxiliary component assembly 350 is less than that of the battery assemblies. The frame member bracket used for the auxiliary component assembly 350 preferably include one or more vibration isolating or damping components to enhance the service life of electrical components disposed therein. Vibration isolating or damping components can enhance the service life of mechanical components disposed in the auxiliary component assembly 350. The frame member bracket preferably facilitate removing the auxiliary component assembly 350 as a unit for service, repair or replacement. The frame member bracket for the auxiliary component assembly 350 can be relatively accessible, for example where the auxiliary component assembly and one or more or all of the frame member bracket are not enclosed in additional housings but are directly coupled to chassis structures of the cargo trailer assembly 100.

The axle assembly 182 supports the axle bearing 184, the battery assembly 196A and the battery assembly 196B (and additional battery assemblies if present) and the auxiliary component assembly 350 as a unit. The unit can be displaced relative to the floor structure 108 and the portion of the van assembly 104 coupled therewith either before or after upfitting the battery assemblies and the auxiliary component assembly 350.

FIG. 6A shows an embodiment in which an axle assembly 182A and a battery slider assembly 197 are provided. The battery slider assembly 197 is configured to be supported by one of both of the first body rail 124A and the second body rail 124B. The battery slider assembly 197 is configured to support battery assemblies (e.g., the battery assembly 196A, battery assembly 196B and other additional battery assemblies if needed). The auxiliary component assembly 350 also can be coupled with the battery slider assembly 197. One, more than one or all of the battery assembly 196A, battery assembly 196B, and auxiliary component assembly 350 can be coupled with one or both of the first body rail 124A and the second body rail 124B by coupling housing brackets thereof with frame member brackets 180 coupled with a slider rail 197A. The battery slider assembly 197 can include two or more slider rails, similar to the axle assembly 182. The battery slider assembly 197 is a slider assembly that allows the position of the battery assemblies and auxiliary component assembly to be selected independently of the relative position of the relative positioning of the van assembly 104 relative to the wheels coupled with the axle bearing 184. This can allow the weight balance to be adjusted as needed, e.g., allowing the wheel base to be selected and thereafter allowing the weight distribution to be separately adjusted by moving the weight of the battery slider assembly 197 relative to the wheels and axles coupled with the axle bearing 184.

FIGS. 6 and 6A can be used to position components of the cargo trailer assembly 100 for particular applications. The floor structure 108, the first body rail 124A, and the second body rail 124B can be coupled as a unit. The axle assembly 182 can be slideably connected to the body rails 124A, 124B. The power needs of the truck 50 in which the cargo trailer assembly 100 is to be used can be considered. In some routes it may be beneficial to provide one, two or more battery assemblies 196A, 196B. In one case the battery assembly 196A are longitudinally aligned with a set of (e.g., two) frame member brackets 180 disposed on each of the outer sides of the first slider rail 190A and the second slider rail 190B. The first slider rail 190A and the second slider rail 190B can be longitudinally extended from a portion of the rails disposed above the axle bearing 184. The second portion 193 of the first slider rail 190A can be spaced laterally from the central axis of the cargo trailer assembly 100 by the same amount as the first portion 192 of the first slider rail 190A. This spacing can allow a wide configuration of the battery assemblies 196A, 196B. In another embodiment the second portion 193 can be located closer to the central axis of the cargo trailer assembly 100 than is the first portion 192 providing a narrower profile in the second portion 193. In one variation the first slider rail 190A and the second slider rail 190B are symmetrical about the central axis of the cargo trailer assembly 100. In another variation one of the first slider rail 190A and the second slider rail 190B provides the second portion 193 aligned with the first portion 192 (e.g., spaced by the same amount from the central axis of the cargo trailer assembly 100) and another one of the first slider rail 190A and the second slider rail 190B provides the second portion 193 disposed closer to the central axis of the cargo trailer assembly 100 than is the first portion 192. The second portion 193 can even overlap to at least some extent with the first portion 192 along the longitudinal axis LA.

After the frame member brackets 180 have been connected to the second portion 193 of the axle assembly 182 the battery assembly 196A and the battery assembly 196B can be upfitted to the brackets, as indicated by the dashed arrows. The upfitted configuration allows the self-contained battery assemblies 196A, 196B to be underslung beneath the axle assembly 182 and/or the battery slider assembly 197. The underslung nature allows lateral outward battery unit containing portions of the battery assembly 196A and battery assembly 196B to be disposed laterally outward of the outside surface of the first slider rail 190A and the second slider rail 190B. Also, the underslung nature allows battery units to be stored in a central portion disposed between the lateral outward portions. The construction of one embodiment of the battery assembly 196A and the battery assembly 196B is discussed below in greater depth in connection with FIG. 7.

FIG. 6 also shows that the auxiliary component assembly 350 can be upfitted to the axle assembly 182 in the third portion 194 of the first slider rail 190A and the second slider rail 190B as indicated by the dashed arrow. The auxiliary component assembly 350 can be upfitted rearward of the wheels coupled with an axle supported by the axle bearing 184. Upfitting the auxiliary component assembly 350 can be accomplished in a similar manner to the upfitting of the battery assembly 196A and the battery assembly 196B. The auxiliary component assembly 350 can be structured similar to the battery assembly 196A and the battery assembly 196B. For example, the auxiliary component assembly 350 can include a first laterally outward portion configured to couple with the frame member bracket 180 disposed on the first slider rail 190A outward thereof and a second laterally outward portion configured to couple with the frame member bracket 180 disposed on the second slider rail 190B outward thereof.

After the battery assemblies 196A, 196B and the auxiliary component assembly 350 have been upfitted or otherwise coupled to the axle assembly 182, relative movement between the van assembly 104 and the axle assembly can be provided to achieve a desired relative position. The desired relative position can be based on the weight distribution of the van assembly 104 and the load therein over and wheels coupled with the axle bearing 184. The desired relative position can be based on shortening the wheel-base to adjust the turning radius of the vehicle as needed.

FIG. 6A enables upfitting one or both of the battery assembly 196A and battery assembly 196B to the battery slider assembly 197 as indicated by the dashed arrows. The auxiliary component assembly 350 can optionally also be upfitted as indicated by the dashed arrow. In some applications components can optionally be placed in the control module 110 such that the auxiliary component assembly 350 is not present. The control module 110 and the auxiliary component assembly 350 can both be present in some applications. After the battery assembly or assemblies and the auxiliary component assembly are coupled with the battery slider assembly 197, the relative position of the battery slider assembly 197 can be adjusted along the floor structure 108 by sliding relative to the first body rail 124A, second body rail 124B. The movement of the battery slider assembly 197 can be completed prior to or subsequent to movement of an axle assembly 182A. If the axle assembly 182A is moveable relative to the first body rail 124A and the second body rail 124B multiple sets of stops members can be provided.

Figure 7:
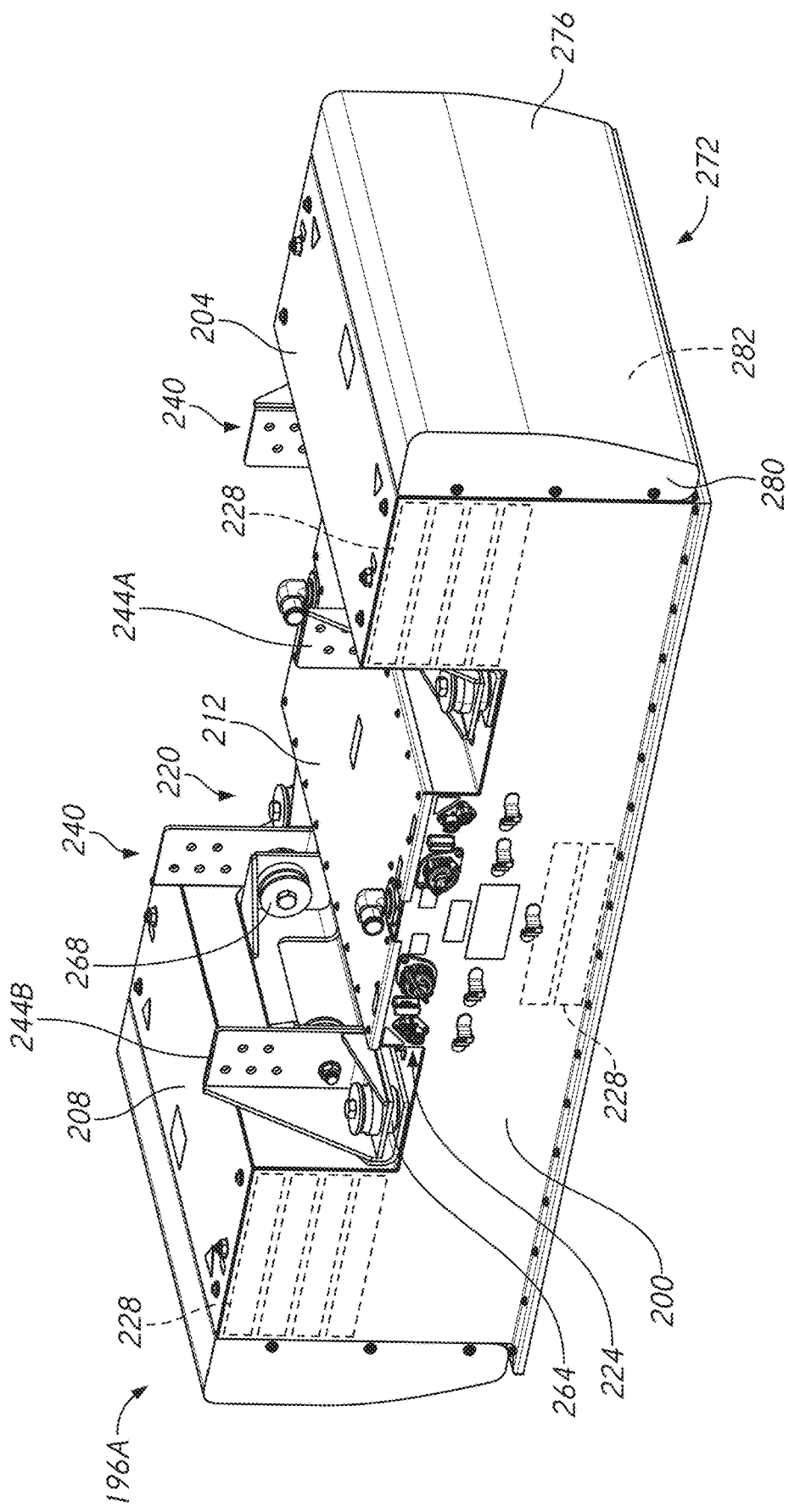
FIG. 7 is a perspective view of a battery assembly configured to be mounted to the cargo trailer assembly of FIG. 1.

FIG. 7 shows one embodiment of the battery assembly 196A discussed above. The battery assembly 196A and the battery assembly 196B can have the same configuration so only the battery assembly 196A will be described. The battery assembly 196A can include a housing 200 that encloses a space within and between a first lateral portion 204 and a second lateral portion 208. The battery assembly 196A includes a central portion 212 disposed between the first lateral portion 204 and the second lateral portion 208. The lower sides of the housing 200 between lateral sides of the housing 200 can be flat or planar. The upper side of the housing 200 can have multiple heights between the lateral sides of the housing. The first lateral portion 204 and the second lateral portion 208 can extend further away from the lower side than portions of the housing 200 therebeween. The first lateral portion 204 and the second lateral portion 208 can house a plurality of battery units 228. The first lateral portion 204 and the second lateral portion 208 can house cooling structures, e.g., liquid cooling conduits and heat sinks to maintain the thermal state of the battery units 228. The central portion 212 can include a portion on the top side of the housing 200 that also projects upward relative to adjacent portions to the top side. The projecting portion can include a space for one or more battery units 228 and can include connections for coolant conduits as well as electrical power conveyances. The projecting portion of the central portion 212 can extend upward by an amount less than the first lateral portion 204 and the second lateral portion 208 or can extend by the same or by a greater extent than the lateral portions.

The top side of the housing 200 can include one or more recesses 220. In particular the recess 220 can include an upwardly oriented recess 224 disposed between a raised central portion of the top side of the housing 200 and the first lateral portion 204 and the second lateral portion 208. The upwardly oriented recess 224 extends from a front side of the housing 200 to a rear side thereof. The upwardly oriented recesses 224 are configured to house a mount system 240. The mount system 240 includes a plurality of housing brackets 244 configured to mate with the frame member brackets 180. A plurality of housing bracket 244 can be disposed in each of two upwardly oriented recesses 224. The recesses 224 can be sized to allow the first slider rail 190A to be partly disposed therein and mounted to first housing brackets 244A along an inner surface of the first lateral portion 204. The recesses 224 can be sized to allow the second slider rail 190B to be partly disposed therein and mounted to second housing brackets 244B along an inner surface of the second lateral portion 208.

The mount system 240 can include a load member 248, a first portion 252 and a second portion 256. The mount system 240 can include an isolator support portion 260 and a first vibration isolator 264 configured to reduce vertical load transmission from the frame member of the vehicle to the housing. The mount system 240 can include a second vibration isolator 268 disposed between the load member and the housing bracket 244. The second vibration isolator 268 is configured to reduce horizontal load transmission from the frame member of the vehicle to the housing. Additional details of the mount system 240 are discussed in the Appendix.

The battery assembly 196A can include a crash protection component 272. The crash protection component 272 can include an enclosure 276 enclosing a space therein, the enclosure 276 configured to be coupled with a mounting bracket assembly 280. The enclosure 276 can enclose a crumple member 282 disposed therein. The crumple member can be configured to collapse upon application of a load of a certain type. For example, a side impact can cause the crumple member to absorb at least some of the energy of the impact by being crushed or collapsing upon itself.

In one embodiment, the crumple member 282 includes a honeycomb structure that has high strength in some directions, e.g., in a vertical direction or in a horizontal direction. The crumple member can be creased, pre-crumped, or non-uniformly weakened to some extent such that the collapse of the structure is predictable or planned or is in a manner that is preferred. The honeycomb structure can be aligned in a vertical direction. For example, the longitudinal axes of the honeycomb structures can be aligned with the vertical direction. The honeycomb structure can be aligned in a horizontal direction. For example, the longitudinal axes of the honeycomb structures can be aligned with the horizontal direction. The honeycomb structures will collapse inwardly or transverse to the longitudinal axes thereof upon a side load above a threshold consistent with a side impact. The mounting bracket assembly 280 can include a bracket member configured to mount directly to the housing 200 while maintaining ingress protection against water. The mounting bracket assembly 280 can allow for fasteners to extend therethrough and into the housing 200 and can also include openings for fasteners disposed parallel to the laterally outer side of the first lateral portion 204 and the second lateral portion 208. Such fastener openings can be configured as blind holes for fasteners disposed along an axis parallel to the outer surface of the first lateral portion 204 or second lateral portion 208.

The crash protection component 272 can be configured with flat lateral sides. The lateral sides can be curved as viewed from a front or rear side, e.g., can extend along a convex outer curve from a top portion to a bottom portion thereof. The crash protection component 272 can be configured to extend close to a bottom surface of the floor structure 108 to provide a smooth continuation of the external surface of the trailer unit 58.

FIG. 8 illustrates one embodiment of a subassembly of the axle assembly 182. The axle assembly 182 is one example of a slider assembly. The axle assembly 182 when fully assembled with wheels is a modification of a structure sometimes known as a bogie. The axle assembly 182 includes axle bearings 184. In the illustrated embodiment the axle assembly 182 includes two axle bearings 184 supporting multiple sets of wheels. The axle assembly 182 and the suspension system 186 which can include the leaf-spring 188 can be disposed in the first portions 192 of the first slider rail 190A and the second slider rail 190B. Transverse frame members extend between the first slider rail 190A and the second slider rail 190B to provide a rigid frame structure. Dashed lines show the second portion 193 disposed forward of the first portion 192 coupled with the wheels. As discussed above, the second portion 193 can extend forwardly from the first portion 192. A continuous outside surface of the first portion 192 to the second portion 193 can allow for greater volume in the housing 200 for battery units 228. Dashed lines show the third portion 194 extending rearward from the first portion 192. The third portion 194 can extend from the outer surface of the first portion 192, e.g., a continuous surface from the first portion 192 to the third portion 194. The lateral outside surface of the second portion 193 and the third portion 194 can be disposed closer the central axis of the axle assembly 182 than is the lateral outside surface of the first portion 192 of the first slider rail 190A. The second portion 193 can be a separate rail of the axle assembly 182 from the first portion 192 such that the portions 192, 193 can even overlap in the longitudinal axis LA of the cargo trailer assembly 100.

The stop member 450 of the axle assembly 182 is configured to allow and to prevent relative movement of the first slider rail 190A and the second slider rail 190B along the first body rail 124A and the second body rail 124B. The stop member 450 can be extended out of the lateral outer surface of the first slider rail 190A and the second slider rail 190B. The stop member 450 can be retracted from the first slider rail 190A and the second slider rail 190B to a position closer to a central portion of the axle assembly 182 along the longitudinal axis LA than is the extended position. The retracted position is one which the stop member 450 does not block movement of the first body rail 124A or the second body rail 124B.

Movement of the stop member 450 can be provided by an actuator 454. The actuator 454 can include a hand operated mechanism. The actuator 454 can include a crank member that can pivot an axle coupled with the stop member 450. The actuator 454 can be accessible from beneath the floor structure 108 of the van assembly 104. In one variation, the actuator 454 can be operated remotely by a stop actuator motor 572 or electrically driven actuator as discussed further below. In another variation, the actuator 454 comprises a pneumatic actuator that employs compressed air or other gas to drive the stop member 450. A switch in the cab 60 of the tractor 54 triggers remote actuation in one embodiment.

FIG. 9 schematically illustrates components that can be integrated into one embodiment of the auxiliary component assembly 350. As discussed above, the auxiliary component assembly 350 can be configured to be upfitted and in some cases underslung beneath the van assembly 104. The auxiliary component assembly 350 can include a frame arrangement 500. The frame arrangement 500 can be disposed in one or more housings to protect electronic components of the auxiliary component assembly 350. The frame arrangement 500 can include a generally horizontal structure, e.g., including one or more horizontal trays to support components in one or more generally horizontal arrangements. The frame arrangement 500 can have a vertical structure in which components are spaced apart vertically. The frame arrangement 500 can be configured as a single unit to mount to a truck 50. The frame arrangement 500 can include first and second portions that can be mounted to the truck 50 remotely or separately. For example, some components of the auxiliary component assembly 350 can be disposed in the control module 110 and/or in the power distribution module 66. Also, some components of the power distribution module 66 and/or the control module 110 can be disposed in the auxiliary component assembly 350.

The frame 500 can include a first component module 504 and a second component module 508. The first component module 504 can include components focused on managing the thermal behavior of one or more components of the truck 50, e.g., a component mounted to the cargo trailer assembly 100 or to the tractor 54. The first component module 504 can include a thermal management system 512.

The thermal management system 512 can include a heater 516, a chiller 518, and a condenser 520 in one embodiment. The heater 516 can add heat to a component such as one or more of the battery assemblies 196A, 196B to improve performance in cold environments. The chiller 518 and the condenser 520 can combine to remove heat from a component, e.g., from one or more of the battery assemblies 196A, 196B to improve performance in hot environments and/or to remove heat generated by the operation of the battery units 228 disposed therein. The thermal management system 512 can include a radiator 521 to remove heat from the thermal management fluid. The thermal management system 512 can communicate with other components via a thermal system junction 522. The thermal system junction 522 can enable connection of one or more coolant hoses to circulate coolant between the first component module 504 and one or more components to be thermally managed. The thermal system junction 522 can include a return side connection to receive a thermal management fluid from a component that generates heat and is to be cooled or that is warmed by the thermal management fluid. The thermal system junction 522 can include a supply side connection to output thermal management fluid to a component to be cooled or heated in a cold environment. The thermal management system 512 can include a pump 524 to cause thermal management fluid to flow through the supply side and the return connections and through conduit disposed therebetween.

The second component module 508 can be disposed in a separate area of the frame 500 from the first component module 504. The first component module 504 and the second component module 508 can be mounted on separate trays of the frame 500, one disposed generally above the other. The second component module 508 can include an electrical circuit system 534. The electrical circuit system 534 can be configured to control the electrical operation of one or more components of the truck 50, e.g., an electric powertrain component of the tractor 54 or the cargo trailer assembly 100. The electrical circuit system 534 can include a power distribution unit 536. The power distribution unit 536 can include circuits that distribute current supplied from any of the battery assemblies 196A, 196B and in some cases the battery assemblies 70A, 70B to the vehicle. The power distribution unit 536 can also control the flow of current to these battery assemblies to replenish the stored power therein. The power distribution unit 536 can also direct current to one or more loads, e.g., to power consuming component in the auxiliary component assembly 350, to the electric motor 64 of the tractor 54 or to a low or high voltage component of the cargo trailer assembly 100.

The electrical circuit system 534 can include a charge circuit 537 configured to receive power from an external charger. In one configuration, the charge circuit 537 can receive a process current from a low voltage AC source or a high voltage DC source. The charge circuit 537 can be operationally coupled with a user interface component 574 configured to convey the charge status of one or more of the battery units 228 and/or of one or more of the battery assembly 196A, the battery assembly 196B, and/or additional battery assemblies. The user interface component 574 can include an array of lights conveying a percentage or status of charge. The user interface component 574 can output one or more numbers conveying a percentage or status of charge. The user interface component 574 can output one or more audible messages conveying a percentage or status of charge. The user interface component 574 can output an indication that the cargo trailer assembly 100 is coupled with an external charge component, such as mechanically by way of the high voltage junction 560 and/or the low voltage junction 564. The indication can warn an operator of the tractor 54 to which the cargo trailer assembly 100 is to be coupled not to drive away prior to disconnecting the external charge component from the high voltage junction 560 or the low voltage junction 564.

FIGS. 1, 4, and 9 show various locations for the user interface component 574. The user interface component 574 can include a display mounted on a forward facing side of the enclosure 112 of the cargo trailer assembly 100. The user interface component 574 can include a display mounted on a driver side of the enclosure 112 of the cargo trailer assembly 100. The user interface component 574 can integrated into the control module 110 disposed on or mounted to the forward side of the cargo trailer assembly 100. The user interface component 574 can be disposed on a forward or lateral side of the control module 110. In some example, multiple user interface components 574 can be provided, e.g., one near the front of the cargo trailer assembly 100 and one near the high voltage junction 560 or low voltage junction 564 if these junctions are spaced away from the front of the cargo trailer assembly 100. The user interface component 574 can be provided on or near a frame 500 of the auxiliary component assembly 350, which can be mounted rearward o the rear axle of the cargo trailer assembly 100.

The auxiliary component assembly 350 can have one or more electrical junctions to facilitate the flow of power to and from the battery assemblies on the truck 50, e.g., on the cargo trailer assembly 100. The auxiliary component assembly 350 can include a trailer high voltage junction 526 that can be coupled with the high voltage conveyance 198 or with another high voltage conveyance disposed between one or more of the battery assembly 196A, battery assembly 196B and the auxiliary component assembly 350. The auxiliary component assembly 350 can include a redundant trailer high voltage junction 528 that can enable one or a plurality of battery units or battery assembly to operate independently. The auxiliary component assembly 350 also can include a high voltage junction 560 can also connect to a high voltage load on the cargo trailer assembly 100 such as the liftgate 118. The auxiliary component assembly 350 can include a low voltage junction 564 configured to be coupled with a low voltage conveyance coupled with a low voltage load on the cargo trailer assembly 100, such as the lights 119. In some applications the liftgate 118 is a low voltage component that can be coupled with the low voltage junction 564. In some embodiments, the control module 110 is connected to one or both of the high voltage junction 560 and the low voltage junction 564 to power loads incorporated therein or supported thereby.

As discussed above, the cargo trailer assembly 100 can have a range extender component configured to replenish the stored power in the battery assembly 196A and/or the battery assembly 196B. The range extender component can include the solar cells 116. The solar cell 116 can coupled with the auxiliary component assembly 350 via a power generation junction 568. The power generation junction 568 can allow current from the solar cell 116 to flow through a conveyance between the cells and the auxiliary component assembly 350 and to be processed and routed therein. For example, in some applications, the auxiliary component assembly 350 includes one or more inverter 540 configured to reconfigure the current derived by the solar cell 116 for storage in the battery assembly 196A and/or the battery assembly 196B. If the range extender components comprise a fuel cell and/or a motor driven generator the power generation junction 568 can be coupled with such component(s) to receive the current generated thereby.

The cargo trailer assembly 100 can be configured for stationary external recharging in addition to charging through a range extender component. The cargo trailer assembly 100 can include a receiving inductive coil circuit 538 that is configured to generate current when in the presence of and sending inductive coil circuit 539 to facilitate wireless charging. The sending inductive coil circuit 539 can be integrated into a loading dock or parking zones of a trailer fleet storage facility. The high voltage junction 560 and the low voltage junction 564 also can be used to recharge the battery assemblies 196A, 196B by connecting a high voltage or a low voltage cable to these junctions e.g., via junction sockets. In some embodiments, the auxiliary component assembly 350 includes dedicated trailer high voltage junction 526, 528 for connecting to the battery assembly 196A, battery assembly 196B.

FIG. 9 illustrates that one or more components of the electrical circuit system 534, including all of the circuits in the electrical circuit system 534 can be duplicated so that the control of power to and from one or more of the battery assemblies 196A, 196B (or from subsets of battery units 228 therein) can be operated independently. By providing independent operation, the truck 50 can operate on a subset of battery units 228 (e.g., part of one of the battery assembly 196A and the battery assembly 196B or only one of the battery assembly 196A or battery assembly 196B). In one implementation, each of the components of the electrical circuit system 534 is duplicated in a parallel electrical circuit system 534A. Each of the electrical circuit system 534 and the electrical circuit system 534A can include a derate circuit 570, 570A configured to cause the power flowing through a particular system to be delivered in a more range efficient manner. For example, the maximum acceleration and/or maximum speed can be regulated to prevent an operator from operating the truck 50 to consume too much power given the load, route and access to recharge facilities available to the truck 50 along its route. These are some non-limiting examples of components that can be included in the auxiliary component assembly 350, e.g. in thermal management system 512 and the electrical circuit system 534.

Figure 10:
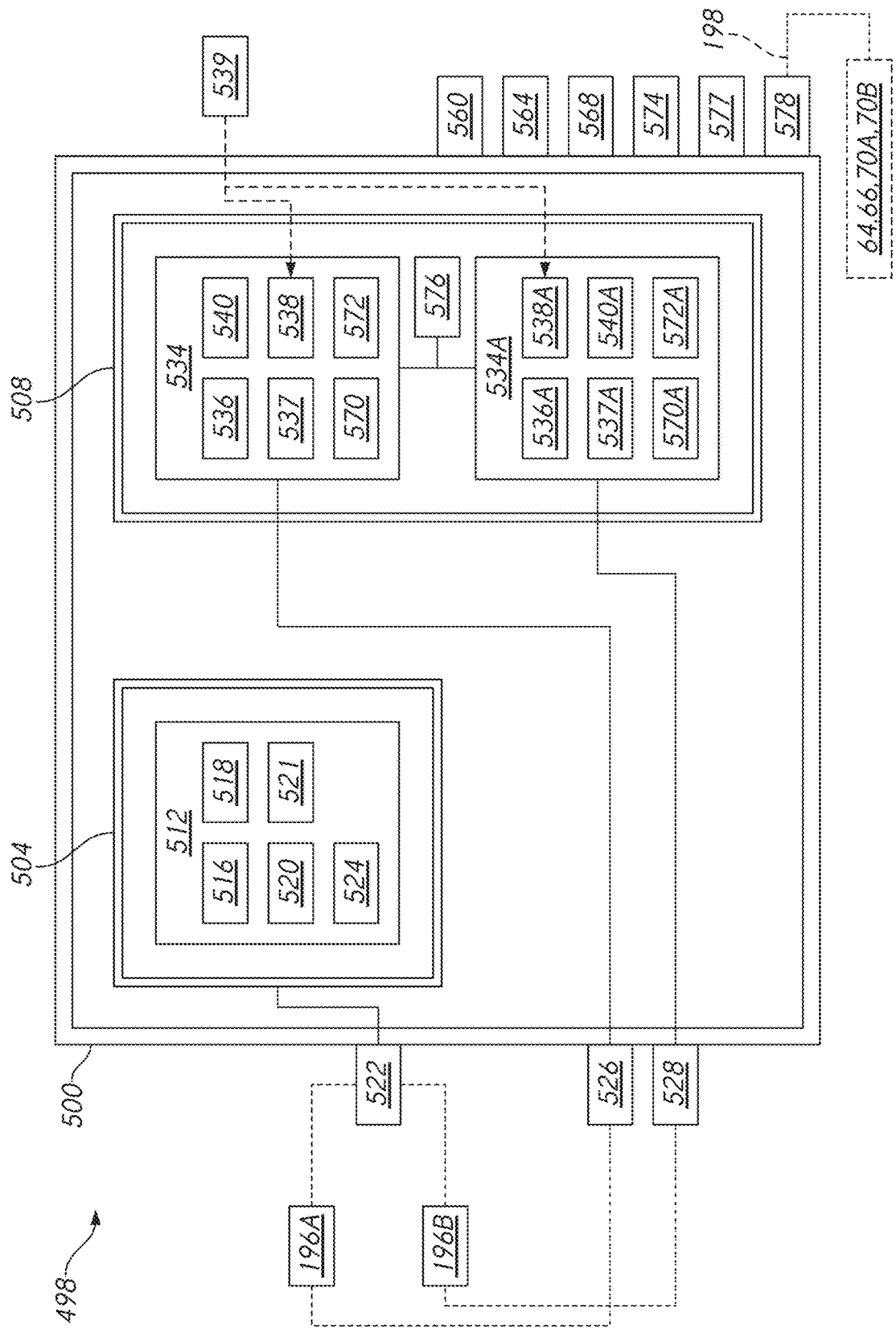
FIG. 10 is a schematic view of components of another embodiment of a trailer mountable power storage and distribution system.

FIG. 9 also illustrates a trailer mountable power storage and distribution system 498. The system 498 can facilitate a modular fitting of powertrain components to the cargo trailer assembly 100. The system 498 can be upfitted to the chassis 120 by coupling the frame 500 to the first body rail 124A, second body rail 124B, the slider assembly 128, the axle assembly 182 or another chassis assembly component. The frame 500 supports the first component module 504 and the second component module 508. The first component module 504 can include thermal management components of the thermal management system 512, as discussed above, that can be coupled with heat generating components mounted on the trailer unit 58 or the cargo trailer assembly 100. The pump 524 can pump coolant through a conduit connected to a thermal system junction 522 of the auxiliary component assembly 350. The conduit can couple to a coolant inflow port of the battery assembly 196A. If more than one battery assembly is provided a second coolant conduit can convey coolant to the second battery assembly. FIG. 10 shows that a second conduit can be connected in parallel to the thermal system junction 522. In another embodiment, a second conduit can extend in series from the battery assembly 196A to the battery assembly 196B.

As discussed above, the auxiliary component assembly 350 can receive power from the battery assembly 196A through the trailer high voltage junction 526. Current can flow through the trailer high voltage junction 526 to the electrical circuit system 534. In one system providing redundancy, a second trailer high voltage junction 528 is provided that can be coupled with the battery assembly 196A. The trailer high voltage junction 528 can receive current from a subset of battery units 228 in the battery assembly 196A that is distinct from a subset of battery units 228 electrically coupled to the trailer high voltage junction 526. As a result, the failure of one of the subsets connected with the trailer high voltage junction 526 would not prevent current from flowing through the trailer high voltage junction 528. Also, the failure of one of the subsets connected with the trailer high voltage junction 528 would not prevent current from flowing through the trailer high voltage junction 526. As discussed above, the derate circuit 570, 570A can modulate the operation of the truck 50 if current is interrupted through either of the trailer high voltage junctions 526, 528.

FIG. 10 illustrates another example of redundancy. In this case, the battery assembly 196A is coupled to the trailer high voltage junction 526 and the battery assembly 196B is coupled to the trailer high voltage junction 528. If the operation of the battery assembly 196A is interrupted, then the truck 50 can be powered from current flowing from the battery assembly 196B through the trailer high voltage junction 528. In that case, the electrical circuit system 534A can deploy the derate circuit 570A to modulate the operation of the truck 50. If the operation of the battery assembly 196B is interrupted, then the truck 50 can be powered from current flowing from the battery assembly 196A through the trailer high voltage junction 526. In that case, the electrical circuit system 534 can deploy the derate circuit 570 to modulate the operation of the truck 50.

FIGS. 9-10 show that the auxiliary component assembly 350 also includes a number of junctions, discussed above. The auxiliary component assembly 350 includes receiving inductive coil circuits 538, 538A that can detect inductive charging fields and can generate current to charge the battery assembly 196A, 196B and other batteries. The high voltage junction 560 and the low voltage junction 564 can provide for connection to high and low voltage loads on the cargo trailer assembly 100 or can be used to export power off the cargo trailer assembly 100 to the tractor 54 or for other uses. The auxiliary component assembly 350 can receive power through the power generation junction 568. The power can come from a range extender module, such as one or more of a solar cell, an array of solar cells, a fuel cell, or a generator. The auxiliary component assembly 350 can distribute that power as needed, e.g., to the battery assembly 196A, 196B to recharge the battery units 228 therein. Power received through the power generation junction 568 can directly supply a load in the auxiliary component assembly 350, in the trailer mountable power storage and distribution system 498, on the cargo trailer assembly 100, or on the truck 50. The frame 500 of the auxiliary component assembly 350 can support the user interface component 574, which can be visible behind the rear wheels of the cargo trailer assembly 100 when the auxiliary component assembly 350 is mounted thereto. The user interface component 574 can instead be coupled with another part of the trailer mountable power storage and distribution system 498, can be provided on a mobile device such as a cell phone or other computer, or mounted to the tractor 54 (e.g., within the cab 60) or to the trailer unit 58 or the cargo trailer assembly 100.

The auxiliary component assembly 350 can include the low voltage junction 577 and high voltage junction 578 to electrically connect the trailer mountable power storage and distribution system 498 to a load on the tractor 54. The high voltage junction 578 can be coupled to the high voltage conveyance 198, which can be coupled to the power distribution module 66 and thereby to the electric motor 64 or another high voltage load. The low voltage junction 577 can be connected to the power distribution module 66 and can support operation of a low voltage component therein or elsewhere on the tractor 54.

The trailer mountable power storage and distribution system 498 provides a number of advantages. For example, the system 498 can enable the operation of a thermal system to remove heat from the battery assembly 196A, battery assembly 196B and other batteries or heat generating loads on the cargo trailer assembly 100 independently of the operation of the tractor 54. The thermal management of the cargo trailer assembly 100 can thus be self-contained. Heat generating components of the trailer mountable power storage and distribution system 498 can be in operation while the tractor 54 is separated from the trailer unit 58 or the cargo trailer assembly 100. This can allow the battery units 228 in the battery assembly 196A, 196B to be recharged after the trailer unit 58, cargo trailer assembly 100 has been delivered to a loading/unloading dock. Battery charging and unloading and loading can be conducted while the tractor 54 is in use to deliver another trailer unit.

Also, providing thermal management on the cargo trailer assembly 100 separate from the tractor 54 eliminates the need for a coolant hoses to span between the tractor 54 and the cargo trailer assembly 100 Eliminating the coolant hoses reduces maintenance and a failure mode and simplifies operation of the truck 50. At the same time, the trailer mountable power storage and distribution system 498 provides liquid cooling of heat generating components, e.g., the battery assembly 196A, battery assembly 196B. This allows for faster charging of the battery units 228 compared to other thermal management structures, such as air cooling.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A trailer mountable power storage and distribution system, comprising:
    a battery assembly comprising a housing and a battery assembly mount system, the housing enclosing a plurality of battery units, the battery assembly mount system configured to couple the battery assembly with a chassis assembly of a trailer unit; and
    an auxiliary component assembly comprising:
        a first component module comprising a thermal management component configured to remove heat from the battery assembly,
        a second component module comprising a power distribution unit configured to electrically connect the battery assembly to a high-voltage electrical motor on a tractor configured to tow the trailer unit, and
        an auxiliary component assembly mount system configured to couple the auxiliary component assembly with the chassis assembly of the trailer unit.

2. The trailer mountable power storage and distribution system of claim 1, wherein the thermal management component is adapted to operate independently of thermal management of the tractor.

3. The trailer mountable power storage and distribution system of claim 1, wherein the battery assembly is a first battery assembly and the housing is a first housing and further comprising a second battery assembly disposed in a second housing separate from the first housing, the second component module configured to electrically couple the second battery assembly to a load on the tractor independently of the first battery assembly.

4. The trailer mountable power storage and distribution system of claim 3, wherein the first battery assembly and the second battery assembly are configured to mount to the chassis assembly of the trailer unit spaced apart along a longitudinal axis thereof, one forward of the other.

5. The trailer mountable power storage and distribution system of claim 1, wherein the battery assembly comprises a first plurality of battery units and a second plurality of battery units, the second component module configured to electrically couple the first plurality of battery units to a load on the tractor independently of the second plurality of battery units.

6. The trailer mountable power storage and distribution system of claim 1, wherein the power distribution unit comprises a first power distribution unit and further comprising a second power distribution unit configured to electrically couple a second battery assembly to a load independently of the battery assembly.

7. The trailer mountable power storage and distribution system of claim 1, wherein the second component module is configured to supply a first current at a first voltage to a first load on the tractor and is configured to provide a second current at a second voltage lower than the first voltage to a second load.

8. The trailer mountable power storage and distribution system of claim 7, wherein the second component module is configured to supply the second current to the second load disposed on the tractor engagable with the trailer unit to which the battery assembly is coupled in use.

9. The trailer mountable power storage and distribution system of claim 7, wherein the second component module is configured to supply the second current to a load disposed on a same trailer unit to which the battery assembly and the auxiliary component assembly are coupled in use.

10. The trailer mountable power storage and distribution system of claim 1, wherein the battery assembly mount system comprises a vibration isolator configured to reduce or eliminate transmission of vibration from the trailer unit to the battery assembly.

11. The trailer mountable power storage and distribution system of claim 1, wherein the auxiliary component assembly mount system comprises a vibration isolator configured to reduce or eliminate transmission of vibration from the trailer unit to the auxiliary component assembly.

12. The trailer mountable power storage and distribution system of claim 1, wherein the auxiliary component assembly comprises a charge circuit configured to control the charging of the battery assembly.

13. The trailer mountable power storage and distribution system of claim 12, further comprising a user interface component coupled with the charge circuit, the user interface component configured to convey charging status of one or more battery units disposed in the battery assembly or of the battery assembly.

14. The trailer mountable power storage and distribution system of claim 1, further comprising a range extender module configured to mount to the trailer unit in a location separate from which the battery assembly and the auxiliary component assembly are mounted in use, the range extender module configured to replenish power stored in the battery assembly and/or supply current directly to a load on the tractor.

15. The trailer mountable power storage and distribution system of claim 14, wherein the auxiliary component assembly is configured to electrically couple to the range extender module and to electrically couple to one or both of the battery assembly and the load.

16. A cargo trailer assembly comprising:
    one or more body rails configured to support a floor structure of an enclosure;
    an axle assembly coupled with the body rails, the axle assembly comprising an axle supporting rear wheels of the cargo trailer assembly;
    the power storage and distribution system of claim 1, wherein the battery assembly and the auxiliary component assembly are coupled with the body rails and/or the axle assembly of the cargo trailer assembly.

17. The cargo trailer assembly of claim 16, wherein the battery assembly is disposed forward of the rear wheels.

18. The cargo trailer assembly of claim 16, wherein the auxiliary component assembly is disposed rearward of the rear wheels.

19. The cargo trailer assembly of claim 16, wherein the one or more body rails comprises a first body rail extending along a longitudinal axis of the cargo trailer assembly and a second body rail extending along the longitudinal axis of the cargo trailer assembly; and wherein the axle assembly comprises a slider assembly comprising a first slider rail slideably coupled with the first body rail and a second slider rail slideably coupled with the second body rail, wherein the slider assembly is configured to adjustably couple the first slider rail and the second slider rail to the first body rail and the second body rail to allow for a change in a fore-aft position of the slider assembly relative to a chassis.

20. The cargo trailer assembly of claim 19, wherein at least one of the battery assembly or the auxiliary component assembly is coupled with one or both of the first and second slider rails.

* * * * *

UNITED STATES PATENT AND TRADEMARK OFFICE
CERTIFICATE OF CORRECTION

PATENT NO. : 11,926,207 B2
APPLICATION NO. : 17/450115
DATED : March 12, 2024
INVENTOR(S) : Ethan J. McKibben It is certified that error appears in the above-identified patent and that said Letters Patent is hereby corrected as shown below:

On the Title Page

Page 2, Column 1, item [56], Line 56, delete "Harrison" and insert -- Harrison III --.

In the Specification

Column 14, Line 25, delete "therebeween." and insert -- therebetween. --.

Column 15, Line 35, delete "fastensers" and insert -- fasteners --.

In the Claims

Column 24, Line 16, Claim 8, delete "engagable" and insert -- engageable --.

Signed and Sealed this
Twenty-first Day of May, 2024

Katherine Kelly Vidal
*Director of the United States Patent and Trademark Office*